United States Patent
Polak

(10) Patent No.: US 7,547,364 B2
(45) Date of Patent: Jun. 16, 2009

(54) SPRAY DEVICE FOR COOLING CATTLE IN SHEDS AND METHOD OF USING THE SAME

(76) Inventor: Arieh Jehuda Polak, 7 Avuka Street, 69086 Tel Aviv (IL)

( * ) Notice: Subject to any disclaimer, the term of this patent is extended or adjusted under 35 U.S.C. 154(b) by 510 days.

(21) Appl. No.: 10/803,868

(22) Filed: Mar. 17, 2004

(65) Prior Publication Data

US 2005/0006497 A1    Jan. 13, 2005

Related U.S. Application Data

(63) Continuation-in-part of application No. PCT/IL02/00762, filed on Sep. 12, 2002.

(30) Foreign Application Priority Data

Feb. 6, 2002    (IL)    ................................. 148040
Jan. 1, 2004    (WO)    ................ PCT/IL2004/000001

(51) Int. Cl.
*B08B 3/00*    (2006.01)
*F24F 3/14*    (2006.01)

(52) U.S. Cl. ................ 134/26; 134/31; 261/84; 261/89; 239/222.11; 239/289; 119/666; 454/228; 454/337

(58) Field of Classification Search ............. 134/26, 134/31, 33, 34, 37, 198; 239/289, 214, 225, 239/222.11; 261/30, 84, 89; 454/228, 337
See application file for complete search history.

(56) References Cited

U.S. PATENT DOCUMENTS 1,066,851 A    7/1913    Siefert (Continued)

FOREIGN PATENT DOCUMENTS

GB    1 052 594    12/1966

OTHER PUBLICATIONS

"Interactions Between Body Condition at Calving and Cooling of Dairy Cows during Lactation in Summer," Flamenbaum et al , Journal of Dairy Science, vol. 78, No. 10, 1995; pp. 2221-2229.

(Continued)

*Primary Examiner*—Michael Barr
*Assistant Examiner*—Saeed T Chaudhry
(74) *Attorney, Agent, or Firm*—Martin Fleit; Paul D. Bianco; Fleit Gibbons Gutman Bongini & Bianco PL

(57) ABSTRACT

A sprayer device including a generator for generating an air stream having a predetermined velocity and a nozzle unit for the discharge of liquid therefrom, whereby to produce a mist stream capable of being propelled to a predetermined location. The mist stream has a measurable and controllable lateral dimension at the predetermined location. The sprayer device is used particularly for moistening cattle, especially cows, in sheds, and taking into account the effect of the wind. Rows of sprayers project water sprays directed toward the cattle. The sprayers may be angularly shifted to take into account the deviating effect of the wind. A processor calculates the angular shift that is needed for the existing wind direction and intensity. All the sprayers concurrently receive the angular shift, which is transmitted to the first sprayer from a control station and successively from each sprayer to the next. In this way, a plurality of sprayers can be controlled even if they are not arranged in straight lines or on a single level, depending on the structure of the cattle shed.

10 Claims, 36 Drawing Sheets

U.S. PATENT DOCUMENTS

| | | | |
|---|---|---|---|
| 1,586,997 A * | 6/1926 | Hull | 239/77 |
| 2,079,117 A | 5/1937 | Hays | |
| 3,011,501 A | 12/1961 | Beranek | |
| 4,443,387 A | 4/1984 | Gordon | |
| 4,476,809 A | 10/1984 | Bunger | |
| 4,566,890 A * | 1/1986 | Hostler et al. | 65/512 |
| 5,146,762 A | 9/1992 | Atkins | |
| 5,338,495 A | 8/1994 | Steiner | |
| 5,370,500 A | 12/1994 | Thompson | |
| 5,372,305 A | 12/1994 | Ballu | |
| 5,643,082 A | 7/1997 | Furukawa | |
| 6,015,262 A | 1/2000 | Huang | |
| 6,086,053 A * | 7/2000 | Natschke et al. | 261/30 |
| 6,223,995 B1 | 5/2001 | Evans et al. | |
| 6,257,501 B1 * | 7/2001 | Roach et al. | 239/289 |
| 6,257,701 B1 * | 7/2001 | Otani et al. | 347/49 |
| 6,568,352 B2 | 5/2003 | Fransen | |
| 6,578,828 B2 * | 6/2003 | Terrell et al. | 261/30 |
| 6,675,739 B2 | 1/2004 | Terrell | |

OTHER PUBLICATIONS

"Dry Period Heat Stress Relief Effects on Prepartum Progesterone, Calf Birth Weight, and Milk Production," Wolfenson et al, Journal of Dairy Science, vol. 71, No. 3, 1988; pp. 809-818.

"Hyperthermia and Body Energy Store Effects on Estrous Behavior, Conception Rate, and Corpus Luteum Function in Dairy Cows"; Wolfenson et al; Journal of Dairy Science; vol. 71; 1988; pp. 3497-3504.

"Cooling Dairy Cattle by a Combination of Sprinkling and Forced Ventilation and its Implementation in the Shelter System"; Flamenbaum et al; Journal of Dairy Science; vol. 69; 1986; pp. 3140-3147.

International Search Report published Jul. 21, 2005 for PCT/IL2004/000001 filed Jul. 21, 2005.

International Preliminary Report on Patentability published Jul. 3, 2006 for PCT/IL2004/000001 filed Jul. 21, 2005.

International Search Report published on Aug. 14, 2003 for PCT/IL02/00762 filed Sep. 12, 2002.

International Preliminary Report on Patentability published on Aug. 6, 2004 for PCT/IL02/00762 filed Sep. 12, 2002.

* cited by examiner

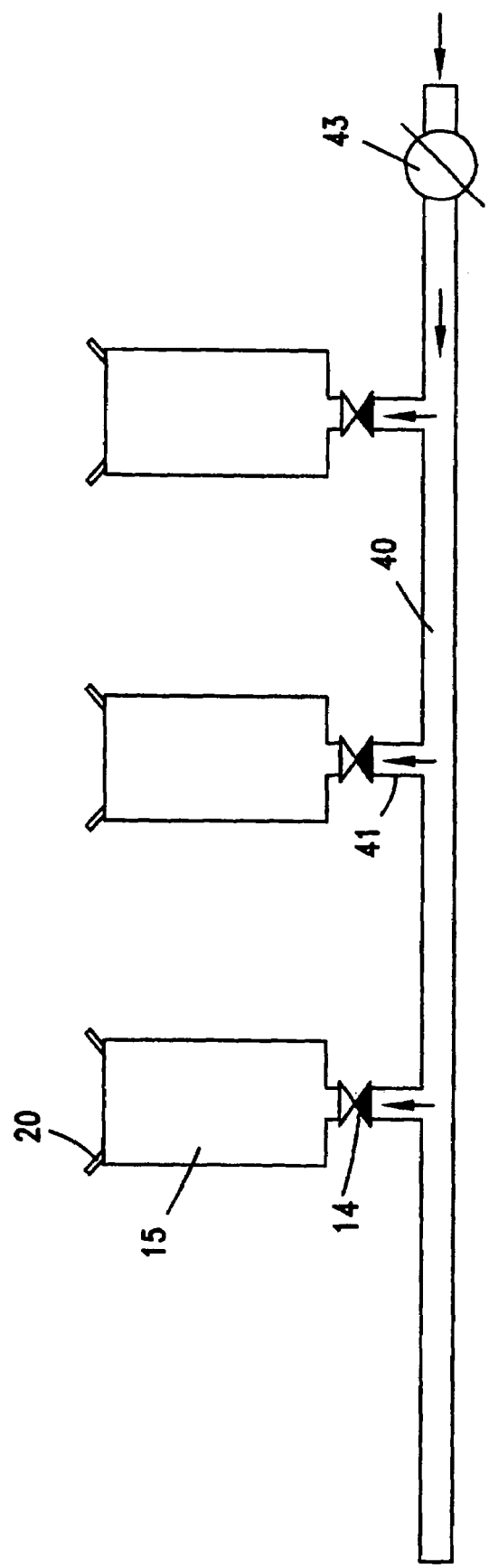

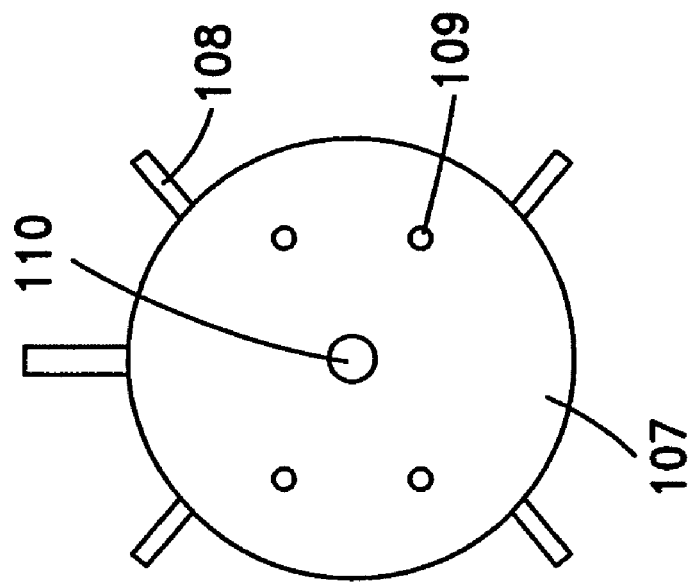
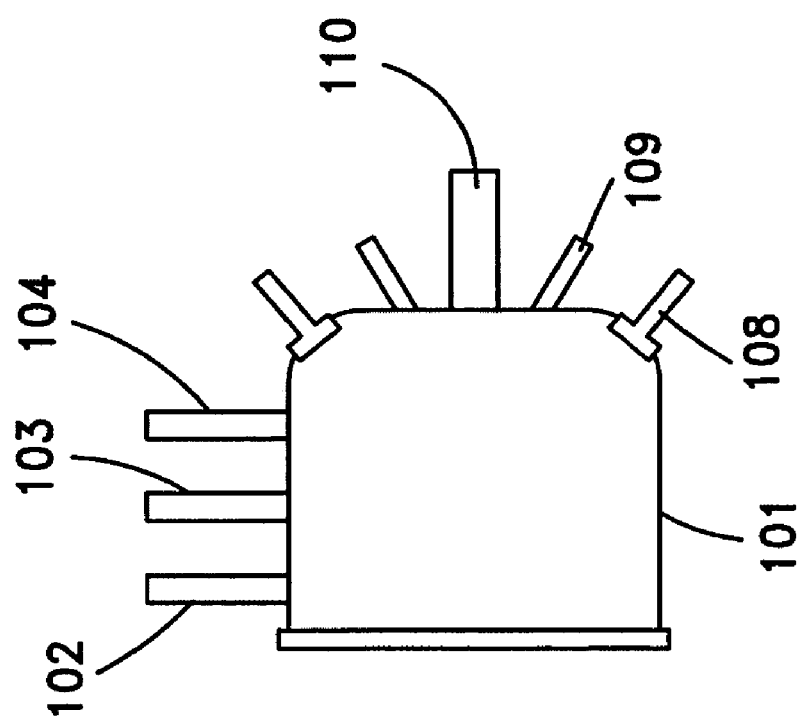
Fig. 13B
Fig. 13A

SPRAY DEVICE FOR COOLING CATTLE IN SHEDS AND METHOD OF USING THE SAME

RELATED APPLICATION

This application is a continuation-in-part of International application serial no. PCT/IL02/00762 filed Sep. 12, 2002, the contents of which are here incorporated by reference in their entirety. Applicant claims the benefit of 35 USC 120.

BACKGROUND OF THE INVENTION

1. Field of the Invention

The present invention relates to the field of spray devices. More particularly, the invention relates to a method and apparatus for directing a mist stream with a predetermined diameter to a target location at a predetermined distance from the spray device. In an aspect of the invention, said method and apparatus are included in a method and apparatus for cooling cattle, by means of coordinated groups of spray devices, which are used in a controlled manner that accounts for environment conditions. Particularly, though not exclusively, said cattle are cows and the cooling is carried out when the cows are housed in a shed and the relevant environment conditions are defined by the prevalent wind streams.

2. Prior Art

One of the requirements for high milk production in summer is relieving heat stress. Several studies have determined that milk production can be increased by installing cooling systems. ("Interactions Between Body Condition at Calving and Cooling of Dairy Cows during Lactation in Summer," Flamenbaum et al, Journal of Dairy Science, Vol. 78, No. 10, 1995 and "Dry Period Heat Stress Relief Effects on Prepartum Progesterone, Calf Birth Weight, and Milk Production," Wolfenson et al, Journal of Dairy Science, Vol. 71, No. 3, 1988). A side benefit to the installation of such cooling systems is that the reproductive performance of cows can be improved with cooling.

A prior art cooling system generally consists of an air distribution duct for directing a turbulent air stream onto the cows and a separate water line that terminates with a nozzle which produces a spray. Nozzles are commonly used, in contrast with discharge directly from a hose, to conserve water. Sprinklers that are positioned in the feeding area of a dairy farm generally provide supplemental cooling, reducing the fan power needed and enabling a marginally hot cow to be much more comfortable. Since cows sweat only one-tenth as much as humans, a spray-fan cooling system conducts away surface heat and increases the vaporization of moisture from the skin. This body cooling effect enhances comfort and increases milk production.

U.S. Pat. No. 5,643,082 discloses an apparatus for generating a cool air stream in which a blower is attached to a window of a building. A water delivering tube having a spray nozzle secured to its front side is detachably disposed in front of the blower, so as to eject water therefrom in the form of mist particles. Holders are attached to the window frame to provide a gap between each spray nozzle and the blower, and the holders are pivotally fitted to the water delivering tube by supporting means. In addition to the relatively complicated structure of the apparatus, other drawbacks concerning the performance of this spray device include inefficient usage of water and an inability to direct the mist to a predetermined location. Also, the apparatus is not capable of operating in an unenclosed area. Thus this apparatus, when employed in a dairy farm, cannot direct the mist to the hair coat of a group of cows, but rather humidifies the hot air, resulting in a waste of water.

U.S. Pat. No. 6,223,995 is directed to a method for cooling golf greens and other vegetation, using a fan with a tubular nozzle member fitted around the fan head.

Although prior art systems provide adequate cooling, they suffer from some drawbacks. Firstly, an inordinate amount of water is wasted. The cooling water is not necessarily directed at the cows, but rather it is discharged throughout a wide region, e.g. within the feeding area, so that an optimal number of heated cows will be cooled by the spray of water. In order to spray water throughout a wide region, a pump and steel pipes are needed so that water may be provided to a spray device at a pressure of approximately 40 atmospheres. Secondly, cows may not seek a spray-cooled comfort zone, and therefore the spray may not be effectively utilized. Water that does not impinge upon the hair coat of a cow falls to the ground. Thirdly, the water that falls to the ground generally collects as puddles and becomes a source of diseases to the cows, such as mastitis, especially in combination with cow droppings, despite the constant operation of a fan that additionally functions as a means to dry the ground.

None of the prior art methods and apparatus is adapted for concurrently cooling a plurality of cattle, particularly cows, more particularly cows in a shed. Each spray device of the prior art directs the spray at an area and not specifically at a cow or a plurality of cows. Additionally, the prior art does not take into account the influence of atmospheric conditions, particularly of the wind, which can divert any spray from its intended target and even render it totally ineffective and wasted. Any attempt to remedy these drawbacks by individually controlling each of the device that spray water would require the intervention of a very large number of operators, who are not available for such operations, and if they were available, would involve a wholly unacceptable manpower cost. This invention provides new method and apparatus for overcoming all the drawbacks and inadequacies of the prior art.

SUMMARY OF THE INVENTION

Specifically, it is an object of the present invention to provide a method and apparatus for directing a spray to a predetermined location.

It is another object to provide a spray device that reduces water usage.

It is a further object to provide a spray device that has an uncomplicated structure.

It is a still further object to provide a method and apparatus for cooling cows with a spray of water, such that excess water does not collect on the ground.

It is a still further object to provide a method and apparatus for cooling cattle arranged in rows, particularly cows housed in a shed.

It is a still further object to provide such a method and apparatus that is automatically controlled.

It is a still further object to provide such a method and apparatus that automatically take into account the influence of the wind.

It is a still further object to provide such a method and apparatus that minimize the consumption of water.

It is a still further object to provide such a method and apparatus that are efficient no matter what is the configuration of the cattle shed.

It is a still further object to provide such a method and apparatus that are efficient when the cattle are arranged in a plurality of rows at an angle to each other.

Other objects and advantages of the invention will become apparent as the description proceeds.

In a first aspect thereof, the present invention relates to a spray device, hereinafter also called "sprayer", comprising a means for generating an air stream having a predetermined velocity and a nozzle unit with at least one inlet for the introduction therein of a liquid and a separate set of nozzles corresponding to each of said inlets for the discharge of liquid therefrom, said nozzle unit fixedly attached to the central portion of said air stream generating means, such that said discharged liquid is entrainable by said air stream whereby to produce a mist stream capable of being propelled to a predetermined location, a lateral dimension of said mist stream having a measurable and controllable value at said predetermined location.

As referred to herein, the lateral dimension of the mist stream is measured in a direction perpendicular to the flow of the air stream, which may be a vertical or horizontal direction, or any other desired direction.

The air stream generating means is preferably a fan having blades and a guard grille, the nozzle unit being centrally mounted on the downstream side of the grille and the blades defining a blade diameter. Still preferably, but not limitatively, the nozzle unit comprises one or more nozzles essentially symmetrically positioned with respect to the center of the fan blades. As will be appreciated by a skilled person, the nozzle unit will preferably possess a low profile, viz. will create the smallest possible disturbance to the air stream generated by the fan. More preferably, the nozzle unit is essentially concentric with the fan blades. The inclination of the fan with respect to a fan support is preferably adjustable, the direction of the mist stream being thereby adjustable.

The spray device or sprayer preferably further comprises a check valve, said check valve being installed within each inlet to the nozzle unit.

The nozzle unit is preferably hollow with a substantially cylindrical, conical or pyramidal configuration. According to one feature of the invention, the nozzle unit is provided with at least one partition, each partition defining two adjacent liquid circulation chambers, wherein the liquid introduced through a corresponding inlet circulates through a corresponding chamber and is discharged through a corresponding set of nozzles. According to another feature, the length of the nozzle unit is greater than its outer diameter and a flange is used to mount the nozzle unit to the grille of the fan.

According to a further feature, the periphery of the nozzle unit is provided with a plurality of apertures, a nozzle being insertable within each aperture. Each nozzle is equidistantly and circumferentially spaced from an adjacent nozzle, the maximum radial spacing between nozzles defining an effective diameter, wherein the effective diameter of the nozzles is less than the blade diameter of the fan.

The spray angle of each nozzle with respect to a longitudinal axis of the nozzle unit ranges from 0 to 75 degrees, and preferably is substantially 45 degrees.

In one embodiment, a front face of the nozzle unit is formed with an aperture and a nozzle is insertable within said aperture, such that the spray angle of the nozzle is approximately 0-75 degrees with respect to the longitudinal axis of the nozzle unit.

The capacity of each nozzle preferably ranges from 5-50 liter/hr. Each nozzle is preferably removable and replaceable.

In one preferred embodiment, the at least one liquid inlet is regulated by a control valve. In another preferred embodiment, each liquid inlet is regulated by a control valve.

In another preferred embodiment, the spray device further comprises a timer, said timer being capable of communicating with an actuator of the control valve, whereby to maintain a cyclic operation of the spray device.

In another preferred embodiment, the spray device further comprises a controller and sensor, said controller operative to regulate the control valve in response to a value relating to ambient conditions sensed by said sensor. The sensor is preferably selected from the group of temperature sensor, humidity sensor, wind direction sensor and wind speed sensor. The controller is preferably operative to control the operation of the air stream generating means.

In one aspect, the spray device further comprises a means for adjusting the radial position of the spray device relative to a vertical post. Preferably, the radial position adjusting means comprises a swingable cross member, a first end of said cross member coupled to a fan support and a second end of said cross member coupled to a shaft assembly, said shaft assembly being mounted to a vertical post., a radial position of the spray device being adjusted upon angular displacement of the cross member.

The cross member is swingable from a first to a second radial position by means of a pressure differential which is produced between an outlet and inlet of the fan, upon generation of an air stream by the fan.

The cross member is preferably swingable from the second to first radial position by means of gravity upon cessation of the air stream. A shaft of the shaft assembly is inclined with respect to a vertical axis of the post, such that the first end of the cross member is higher than the second end at the second radial position, the cross member being swingable from the second to first radial position by means of gravity acting upon the first end. The angular displacement from the first to second radial position and from the second to first radial position is preferably adjustable In another preferred embodiment a network of spray devices is provided, each spray device being one of the aforementioned spray devices. In one embodiment, the inlet to the network is regulated by a control valve. In another embodiment, the inlet to each spray device is regulated by a control valve. In a further embodiment, the controller regulates a plurality of control valves.

The present invention is also directed to a method for directing a spray to a target location, comprising generating an air stream having a predetermined velocity, generating a spray of liquid, such that said spray of liquid is injected into said air stream and entrained thereby, whereby to produce a mist stream having a measurable and controllable lateral dimension; and allowing said mist stream to be propelled by said air stream for a predetermined length so that at said target location the lateral dimension of said mist stream is substantially of a predetermined value.

The air stream is preferably generated by means of a fan having a guard grille and fan blades. The spray of liquid is preferably, but not limitatively, generated by allowing a liquid having a sufficient flow rate to flow through a conduit and to be introduced into a nozzle unit which is mounted onto the grille of the fan, whereupon the liquid is discharged as a spray through each of a set of nozzles provided with said nozzle unit.

Each nozzle is preferably disposed at a spray angle and sufficiently spaced from an adjacent nozzle to define an effective diameter of the nozzles. The discharges from each of the nozzles preferably converge slightly downstream from the nozzle unit.

The lateral dimension of the mist stream is controlled by modifying the value of at least one parameter selected from the group of effective diameter of the nozzles, distance to the target location, spray angle, diameter of fan blades, velocity of air stream and density of the liquid that is propelled by the air stream. The concentration of the mist stream is controlled by regulating the flow rate of the liquid to be sprayed and by changing the outlet size of each nozzle.

In one aspect, the method of the invention further comprises the step of adjusting a radial position of the spray device relative to a vertical post. Preferably, the spray of liquid is injected into the air stream after the radial position of the spray device is adjusted. The radial position of the spray device is adjusted by providing a cross member, a first end of which is coupled to a fan support and a second end of which is coupled to a shaft assembly mounted to a vertical post, and by swinging said cross member about said shaft assembly, a radial position of the spray device being adjusted upon angular displacement of the cross member. The cross member is swung from a first to a second radial position by means of a pressure differential which is produced between an outlet and inlet of the fan, upon generation of an air stream by the fan. The cross member is swung from the second to first radial position by means of gravity upon cessation of the air stream. The angular displacement from the first to second radial position and from the second to first radial position is preferably limited.

The mist stream may be used, by example, to cool overheated animals, to wash cars, to spray perfume in a wedding hall, to apply pesticide within a warehouse, to moisten textile fibers to be processed, to produce, to increase the moisture content within a greenhouse or to apply insecticide to plants grown within a greenhouse. All such uses are comprised within the scope of the invention.

In another main aspect thereof, the present invention provides a method for cooling cattle housed in a shed and distributed in rows, which comprises the following steps:
 a) providing a plurality of spray generators;
 b) distributing said spray generators in a configuration corresponding to the configuration of the cattle rows in the shed; and
 c) concurrently actuating said spray generators to generate water sprays, each of them directed substantially to at least one head of cattle.

It is possible, however, and in many cases it occurs, that air streams exist in the shed and may interfere with the trajectory of the water sprays, so they or part of them do not reach or fully reach their intended targets. Generally, said air streams are winds or are generated by winds, and hereinafter, for brevity's sake, the term "wind" will be used to designate any air stream, no matter how generated or what is its intensity. Therefore, preferably, the said method for cooling cattle also comprises the steps of:
 d) sensing the direction and optionally the speed and/or other relevant parameters, if any, of the wind;
 e) concurrently changing the direction of the water sprays according to the direction and optionally the speed and/or other relevant parameters, if any, of the wind, in such a way that each spray will still be directed substantially to at least one head of cattle.

While the cattle are typically cows, they may be other kinds of cattle, and while the cattle are typically distributed in rows because they are in a shed, they may be so distributed for other reasons, and all such variants are comprised in the invention.

The invention also provides an apparatus for cooling cattle, typically cows, distributed in rows, typically because they are housed in a shed, which comprises the following components:
 I—a plurality of water spray generators, arranged in one or more rows corresponding to the configuration of the cattle rows;
 II—actuating means for concurrently actuating and concurrently stopping all of said water spray generators of said row or rows; and
 III—kinematic connecting means for concurrently controlling the direction of the water sprays generated by said water spray generators of said row or rows.

In view of the possible existence of winds, as this term is defined hereinbefore, the apparatus for cooling cattle of the invention preferably further comprises:
 IV—wind sensor means for sensing the direction and optionally the speed and/or other relevant parameters, if any, of the wind; and
 V—means for actuating the aforesaid kinematic means according to the direction and optionally the speed and/or other relevant parameters, if any, of the wind sensed by said sensing means.

Preferably, if said water spray generators or sprayers are considered as arranged in a succession, said kinematic means connect each sprayer to the next, and concurrently changes or adjusts, if and when needed, the direction of the water sprays generated by them. The direction of the water sprays is changed or adjusted by angularly displacing the sprayers about a substantially vertical axis.

Each of the sprayers is preferably structured as hereinbefore described. It preferably comprises a fan having blades defining a blade diameter and a guard grille, and comprises a nozzle unit for feeding water from a feed conduit, which is being centrally mounted on the downstream side of the grille and the blades; and each nozzle unit is essentially concentric with the fan blades, comprises one or more nozzles essentially symmetrically positioned with respect to the center of the fan blades, and has preferably a low profile, viz. creates the smallest possible disturbance to the stream of air generated by the fan. The pressure of the liquid introduced to the nozzle unit ranges from 3 to 6 atmospheres.

The orientation of each sprayer may be defined by the direction of the spray at its source, which is generally the direction of the air stream generated by the fan, and may be called the axis of the sprayer. Thereafter the spray is deflected downwards by gravity and at various angles by the motion of the atmosphere traversed by the spray, particularly the wind, if any. A plane perpendicular to the direction of the spray at its source, viz., viz. perpendicular to the axis of the sprayer, may be called the face of the sprayer. In preferred embodiments of the invention, the sprayers are mounted generally vertically, viz. with their axes directed horizontally, and may be angularly displaced, viz. oriented about horizontal axes, to modify the spray ranges. In another embodiment, however, later to be described, the sprayers are mounted generally horizontally, viz. with their axes directed vertically, and may be angularly displaced, viz. turned about horizontal and/or vertical axes, to aim the sprays, and in this case they are mounted at the top of space in which their target are located, for example at the ceiling of a shed in which cattle are housed. Since all sprayers are angularly displaceable, it should be understood that whenever it will be said that the axis or the face of a sprayers is vertical or horizontal, it is meant that it angularly displaceable about a vertical/horizontal direction, or, in other words, that its average direction is vertical/horizontal.

In order that the direction of the water sprays generated by the sprayers may be controlled and directed to the desired targets, each of said sprayers, in addition to being oriented about a horizontal axis, as said above, must also be must be pivotally displaceable about a vertical axis. Changes in the wind direction and speed also affect the water spray range, which decreases/increases, all other things being equal, as the component of the wind along the desired direction of the water spray decrease/increase. In a limit condition, if said component is reversed, viz. if the wind blows in the opposite of said desired direction, the water spray range decreases/increases as said component increases/decrease, and said range may become zero or even be reversed. Therefore the direction and speed of the wind and/or other relevant parameters, if any, sensed by the wind sensor are preferably transmitted to a computer which outputs the calculated rotation of the sprayers about a vertical axis, viz. the horizontal rotation, required to maintain the desired direction and range of the water sprays. Said other relevant parameters may include the humidity of the wind and its temperature.

Preferably, each sprayer is mounted on a horizontal axis which is the bottom side of a quadrilateral, preferably rectangular, support. Said support, specifically its top side if the support is rectangular, is solid with a short, vertical shaft, which is rotatably mounted in a sleeve attached to a static element, e.g. a partition, of the cattle shed. Said vertical shaft carries a first or high gear wheel and a second or low gear wheel. Other structural arrangements are of course possible, as long as the sprayer can be rotated about a vertical axis with respect to a static structural element.

A control station is provided for controlling the direction of the sprayers. The kinematic connecting means for concurrently controlling the direction of the sprayers may be of any kind that appears convenient to skilled persons but preferably comprises, for each sprayer, a two-way flexible member, viz. a flexible member, e.g. a metal or plastic or textile cable, that is continuous as it comprises two legs connected at both their ends. A two-way flexible member passes around the vertical shaft of each sprayer. The sprayer closest to said control station will be called the first sprayer, the successive one will be called the second sprayer, and so on till the last sprayer. The flexible member that passes around the vertical shaft of the first sprayer, also passes around a support located at said control station, and will be called the first flexible member. Each flexible member other than the first pass around the vertical shafts of two adjacent sprayers, viz. one sprayer and the preceding sprayer, wherein "preceding" means the nearest sprayer that is closer to the control station.

Means are provided for displacing said first flexible member along itself, e.g. means for paying out one of its legs and drawing in the other leg, from said control station, wherein said means may be actuated merely by a manual action. Transmission means are provided for translating the displacements of said legs into rotation of said first sprayer about a vertical axis. Said transmission means may comprise, in an embodiment of the invention, the aforementioned first/second gear wheel of the first sprayer and a meshing first gear carried by said first flexible member. The second/first gear wheel of the first sprayer meshes with a second gear carried by a second flexible member, and this latter engages a first/second gear keyed to the vertical shaft of the second sprayer, and causes it to rotate. The rotation is transmitted in the same way from the second sprayer to the thirst, and so on, till the last sprayer. In this way the desired rotation is carried along the row of sprayers from the one closest to the control point to the farthest.

The range of the water sprays also depends on the slant of the sprayers, viz. the angle that the axis of each sprayer makes with a horizontal plane. Therefore it may be desirable, according to an embodiment of the invention to vary or adjust said slant. This would require rotating each sprayer about a horizontal axis, which can be done manually. However, said rotation, if desired, as well as other actions that may be desirable for the operation of the sprayers, may be generated and controlled by control means, typically electromagnetic means, known per se, that may be included in the fans or in the supports of the sprayers. The concurrent actuations of such means is within the ability of skilled persons and need not be described.

For example, one of such control means may cause and control the intermittent cooling of cows. Optimal cooling of cows will take place when the water sprays are produced intermittently. By closing the water inlet to the nozzle units of the sprayers, cows will not be over-wet and water will be conserved. After the cows are wetted and the water inlets are closed, the air streams may continue to flow, so as to continue water evaporation and cooling from the cows.

A feature of this invention is that, since the angular adjustment is transmitted from one sprayer to the next, it permits to adapt to any layout of the shed. For instance, if the cows are aligned successively along two lines forming an angle to one another, the sprayers may be similarly aligned, one of them being located at the junction of the two lines. If it is not convenient to place a sprayer at said junction, only a vertical shaft having two gear wheels keyed thereto need to be placed at said junction. Several such shafts permit to deal with more complicated shed layouts and consequent irregular alignments of the cow positions and of the sprayers. These features are applicable to all embodiments of the invention, regardless of whether the axes of the sprayers are horizontal or slanted from the horizontal by acute angles, e.g. less than 45 degrees, or are vertical or slanted from the vertical by acute angles, e.g. less than 45 degrees, and regardless of whether the sprayers are attached to a vertical structural element, e.g. a wall, or a horizontal structural element, e.g. a ceiling. It should also be understood that, while vertical or horizontal sprayers and shafts are illustrated in the present description and mentioned in the appended claims, departures from the described and/or mentioned vertical or horizontal directions are possible, though generally undesirable, and would not involve a departure from the scope of the invention.

In one aspect, the spray device further comprises a means for adjusting the radial position of the spray device relative to a vertical post. As has been said before, the radial position adjusting means preferably comprises a swingable cross member, a first end of said cross member being coupled to a fan support and a second end of said cross member being coupled to a shaft assembly, said shaft assembly being mounted to a vertical post, the radial position of the spray device being adjusted upon angular displacement of the cross member. The cross member is swung from a first to a second radial position by means of a pressure differential which is produced between an outlet and inlet of the fan, upon generation of an air stream by the fan, and is swung from the second to first radial position by means of gravity upon cessation of the air stream. A shaft of the shaft assembly is inclined with respect to a vertical axis of the post, such that the first end of the cross member is higher than the second end at the second radial position, the cross member being swingable from the second to first radial position by means of gravity acting upon the first end. The angular displacement from the first to second radial position and from the second to first radial position is preferably adjustable.

The present invention also provides a method of washing a body, which comprising the following steps:

a) generating an air stream having a predetermined velocity;

b) providing a nozzle unit with a first inlet and a second inlet for the introduction therein of water and of a chemical solution, respectively, and a first and second sets of nozzles corresponding to said first and second inlets, water and said chemical solution being capable of circulating in separate chambers within said nozzle unit;

c) allowing water to flow into said first inlet;

d) allowing a spray of water to be discharged from said first set of nozzles, such that said spray of water is injected into said air stream and entrained thereby, whereby to produce a first mist stream having a measurable and controllable lateral dimension and allowing said mist stream to be propelled by said air stream for a predetermined length so that at said target location said first mist stream is capable of moistening dirt particles attached to the surface of a body;

e) after a first predetermined period of time, allowing said chemical solution to flow into said second inlet;

f) allowing a spray of chemical solution to be discharged from said second set of nozzles, such that said spray of chemical solution, together with said spray of water, is injected into said air stream and entrained thereby, whereby to produce a second mist stream having a measurable and controllable lateral dimension and allowing said second mist stream to be propelled by said air stream for a predetermined length so that at said target location said second mist stream is capable of spraying said body and producing a foam thereon;

after a second predetermined period of time, preventing flow of said air stream, flow of water into said first inlet and of said chemical solution into said second inlet;

after a third predetermined period of time, repeating steps a)-d), water being introduced into said first inlet at a predetermined pressure;

after a fourth predetermined period of time, preventing flow of water; and after a fifth predetermined period of time, transporting the washed body.

In one embodiment, the body is that of a motor vehicle. In another embodiment, the body is an animal body.

In a preferred embodiment, the first predetermined period of time is approximately 1 minute, the second predetermined period of time is approximately 0.5 minute, the third predetermined period of time is approximately 5 minutes, the fourth predetermined period of time is approximately 2 minutes and the fifth predetermined period of time is approximately five minutes.

In one embodiment, the method further comprises, after step i), providing said nozzle unit with a third inlet and a corresponding third set of nozzles, allowing a spray of wax to be discharged from said third set of nozzles, and after a sixth predetermined period of time, preventing flow of wax. According to a preferred embodiment of the invention, the sixth predetermined period of time is approximately 1 minute.

The chemical solution is preferably an aqueous solution comprising a compound selected from the group consisting of surfactant, aliphatic alcohol, aminoalcohol, alkanol amide, sodium hydroxide, glycol ester, or a mixture thereof. The chemical solution may comprise anionic surfactant, ethanol amine and butyl glycol. Preferably, the concentration of the surfactant ranges from 0.05 to 2 wt %, of alkanol amide ranges from 0.1 to 1 wt %, of ethanol amine ranges from 0.1 to 1 wt %, of sodium hydroxide ranges from 0.1 to 1 wt %, and of glycol ester from 0.5 to 5 wt %.

In one preferred embodiment, the body is washed by means of longitudinally displaceable spray devices. The body is preferably washed by two lower spray devices, each lower spray device being disposed at a different side and having a predetermined transversal spacing therefrom, and by an elevated spray device. Each spray device is preferably guided along a corresponding track and is displaced a length equal to at least the length of the body during a time interval equal to a corresponding predetermined period of time. In a second preferred embodiment, the body is washed by a plurality of stationary spray devices. Each spray device is preferably disposed at a predetermined transversal spacing from the body. The number of spray devices preferably corresponds to the length of the body.

BRIEF DESCRIPTION OF THE DRAWINGS

In the drawings:

FIGS. 2A and 2B is a side view of a controllable mist stream generated with the use of the present invention which is directed at a target location, wherein FIG. 2A illustrates a non-elevated spray device and FIG. 2B illustrates an elevated spray device;

FIG. 4 is a side view of nozzle in accordance with the present invention, wherein

FIG. 5 shows an arrangement in which a plurality of spray devices are employed;

FIG. 13 illustrates a nozzle unit with a plurality of inlets and corresponding sets of nozzles;

DETAILED DESCRIPTION OF PREFERRED EMBODIMENTS

Figure 1:
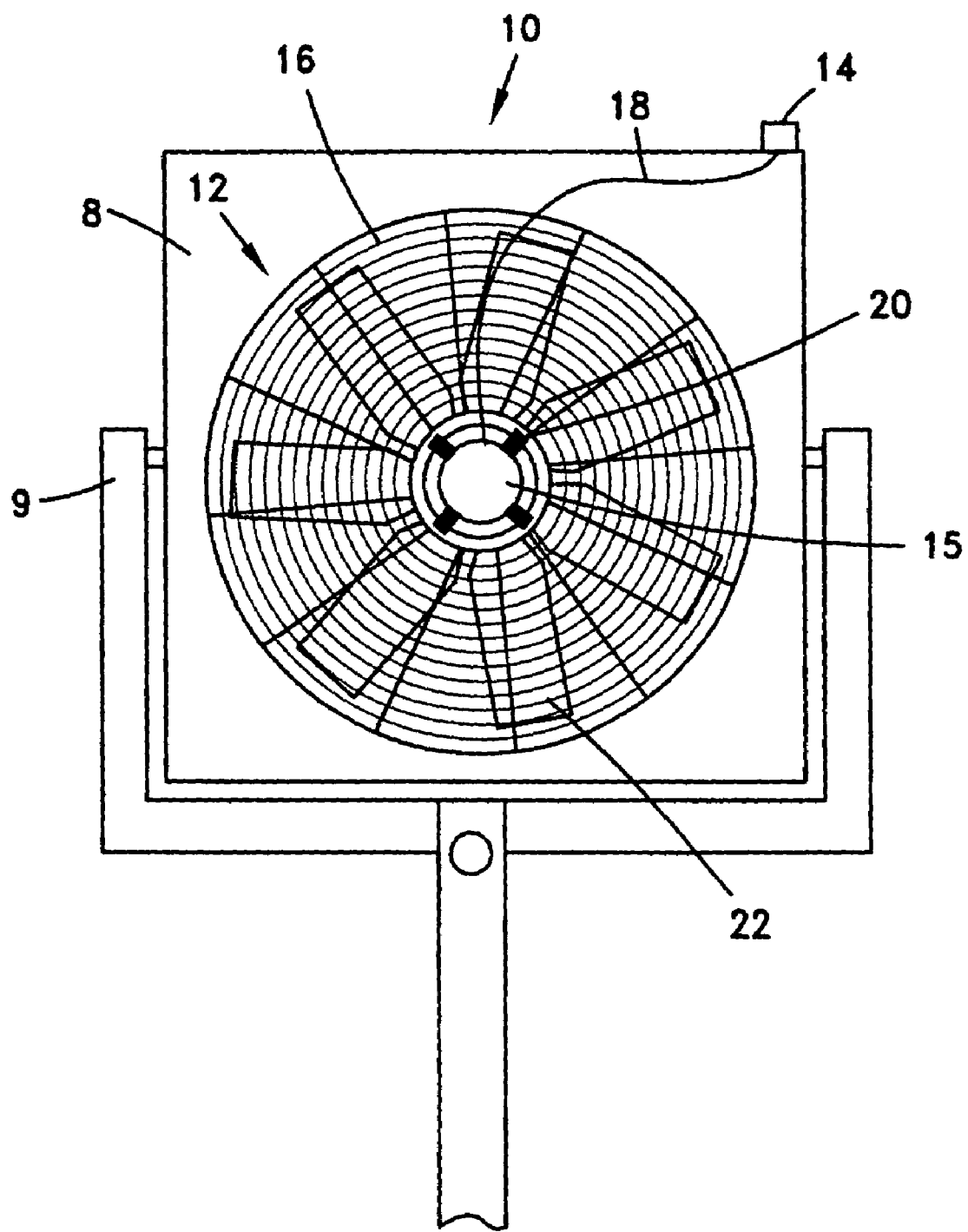
FIG. 1 is a front view of a spray device, in accordance with one preferred embodiment of the present invention.

FIG. 1 illustrates a spray device, generally designated by item 10, which comprises conventional fan 12 and nozzle unit 15 centrally mounted on the downstream side of grille 16 provided with fan 12. Water, or any other desired liquid, flows through hose 18 from check valve 14 into nozzle unit 15, whereupon a spray of liquid is discharged through each nozzle 20. The water particles which are discharged from nozzles 20 form a mist having a definite and controllable stream diameter, whereby the mist may be directed to a desired location upon entrainment within the air stream generated by fan blades 22. The direction of the stream of mist may be modified by adjusting the inclination of fan housing 8 with respect to fan support 9.

Figure 2A:
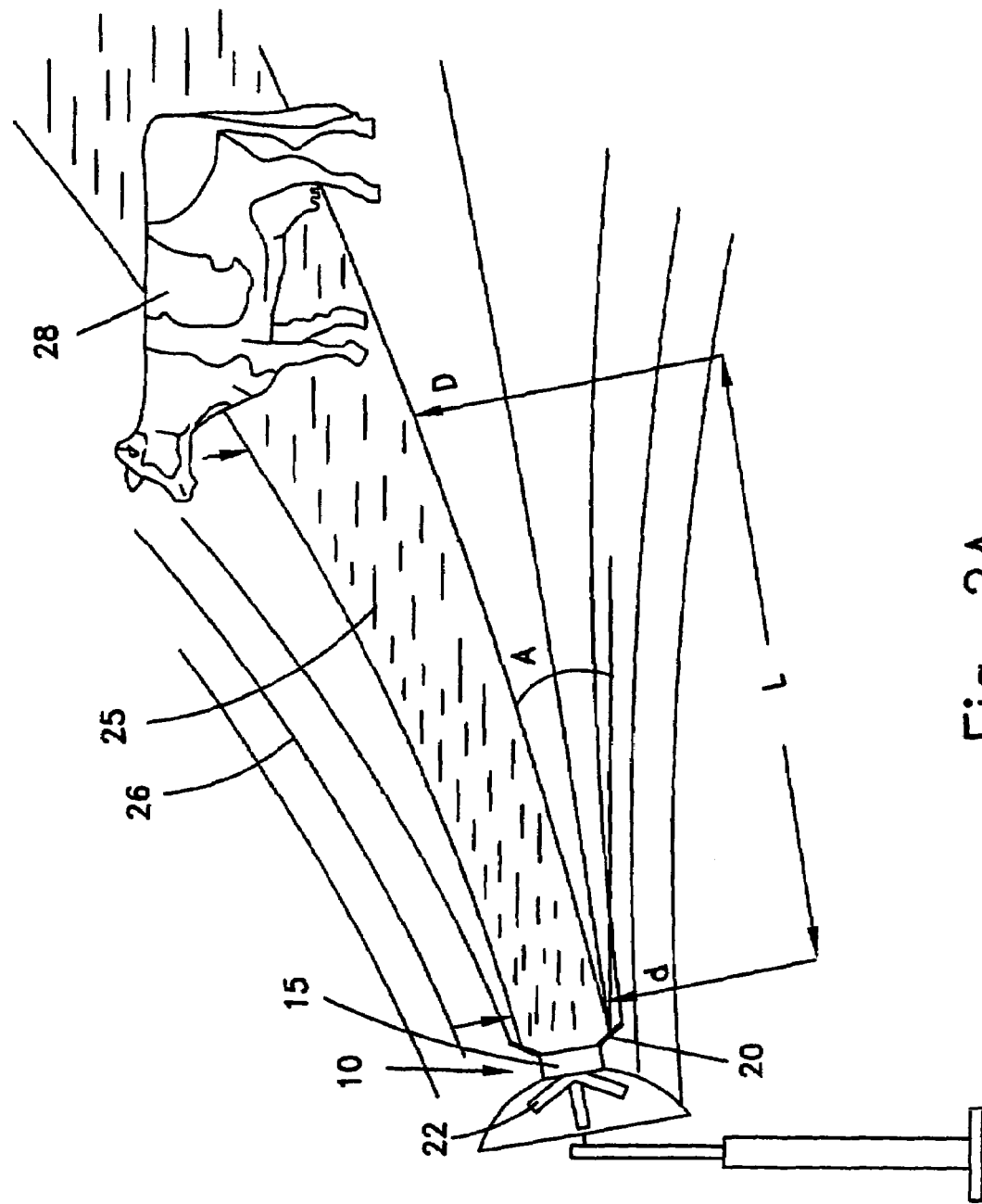
Figure 2B:
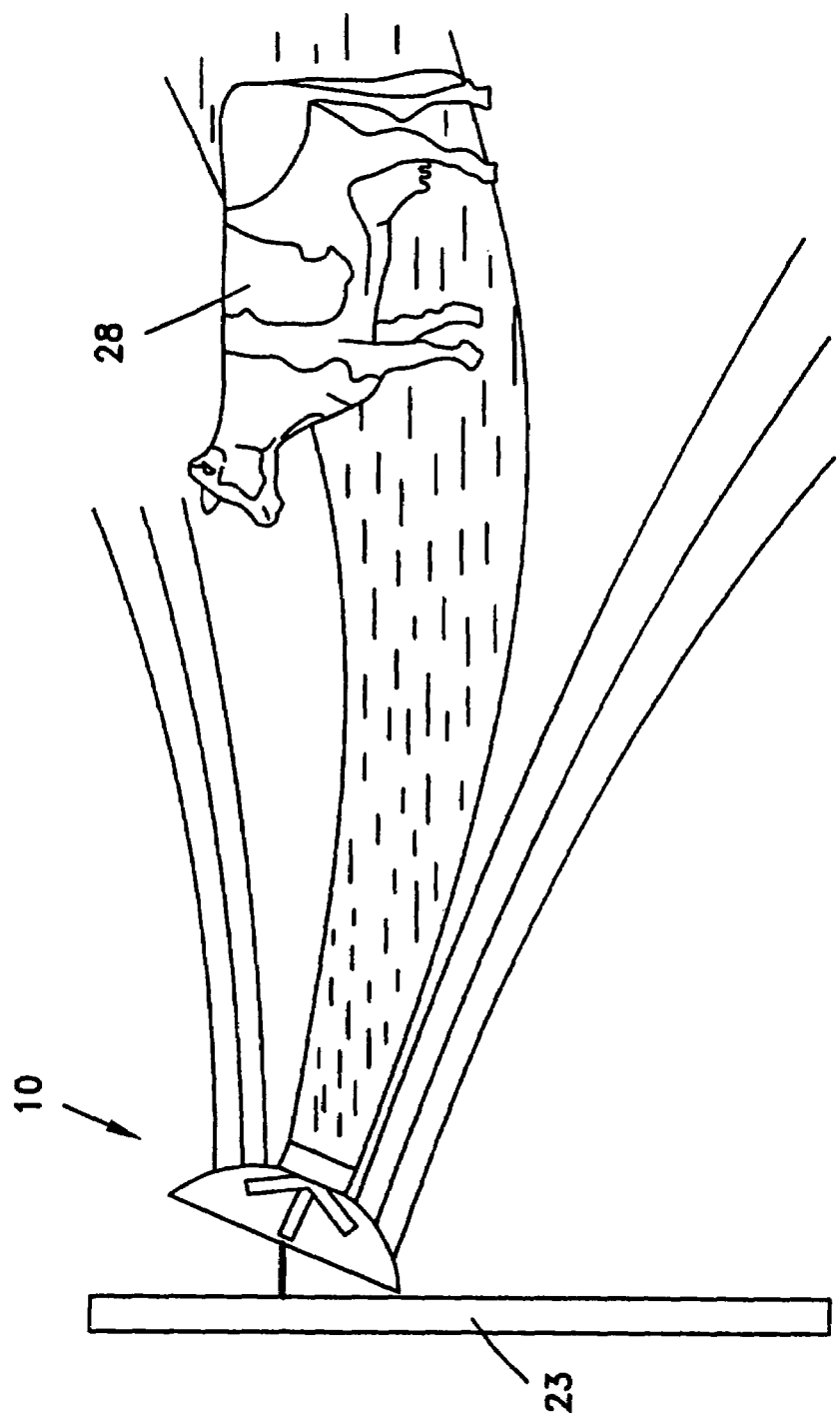

As seen in FIG. 2A, mist stream 25 generated by spray device 10 has the properties of a beam, namely it has a measurable starting diameter d and a measurable ending diameter D, greater than the starting diameter, after being directed a predetermined distance L at an angle of A relative to a horizontal plane. Starting diameter d is approximately equal to the diameter of a circle formed by the plurality of nozzles radiating from nozzle unit 15. The discharge of nozzle unit 15 is released into the vacuum which is formed at the upstream side of air stream 26, corresponding to the location of the fan motor (not shown). The droplets that are discharged from nozzle unit 15 are not able to be randomly dispersed because of the pressure and turbulence of air stream 26 produced by fan blades 22, which flows over mist stream 25 and confines the latter to a limited diameter. Mist stream 25 is thereby propelled downstream and entrained within air stream 26. Since the beam-like nature of mist stream 25 is retained over the length of distance L, mist stream 25 may be accurately directed to a target location, e.g. the body of cow 28. Angle A can be adjusted by changing the inclination of the fan housing with respect to the fan support. Spray device 10 may be mounted close to the floor as shown (in which case its axis is slanted upwards), or may be elevated as shown in FIG. 2B, e.g. attached to post 23 (in which case its axis is slanted downwards), or attached to the ceiling (in which case its axis is vertical or close to vertical), which variant is not shown in the said drawings, and in any case positioned such that mist stream 25 is directed at cow 28.

The spray device may be advantageously employed indoors or outdoors. When used in an unenclosed area, it is preferable to orient the spray device so that the mist stream flows in a similar direction as the wind, viz. that the spray device axis is approximately parallel to the direction of the wind, in order to avoid mist stream stagnation.

Figure 3:
FIG. 3 is a photograph of a mist stream in accordance with the present invention.

A photograph of a controllable mist stream is shown in FIG. 3. The mist stream is shown as being white in contrast to the black background. The lateral dimension of the mist stream is shown to progressively increase from a location corresponding to the immediate discharge of the nozzle unit to a distance downstream thereof.

The size of ending diameter D is dependent upon several parameters: starting diameter d, distance L, the spray angle, diameter of fan blades, velocity of air stream 26 (or equivalently rotational speed of fan blades 22) and density of the liquid that is propelled by the air stream. By increasing the value of any one of these parameters, without changing the value of the other parameters, ending diameter D will be larger. Thus mist stream 25 can be controlled in terms of its size, direction and target distance by varying one or more of the aforementioned parameters as a result of design constraints. The concentration of droplets within the mist stream is dependent upon the size of each droplet and the flow rate of the liquid within the inlet to nozzle unit 15. The size of each droplet in turn is a function of the outlet size of the nozzle.

Figure 4A:
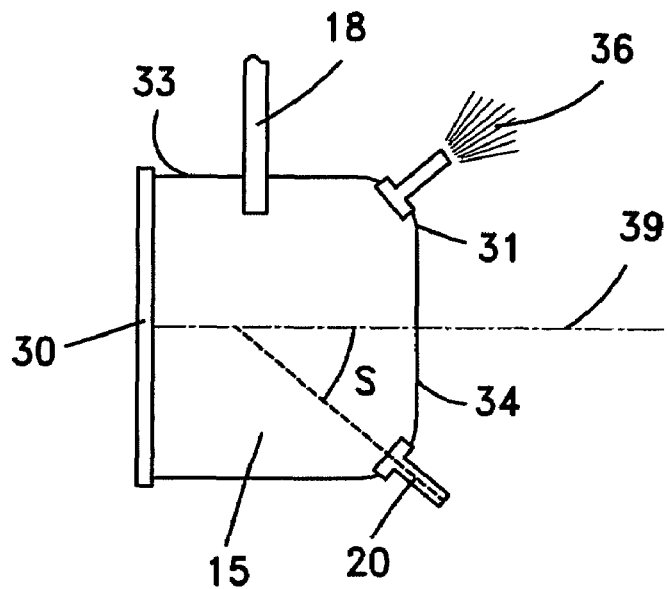
FIG. 4a shows the employment of four nozzles and FIG. 4b shows the employment of one nozzle.

Nozzle unit 15 is shown in FIG. 4a and is hollow with a cylindrical configuration, having a length greater than its outer diameter. Flange 30 is used to mount the nozzle unit to the grille of the fan, e.g. by screws, by bonding or by a spring lock. A plurality of apertures, e.g. four, are bored into fillet 31, the surface at which circumference 33 and front face 34 of the nozzle unit meet. Each nozzle 20, which is preferably flexible and is by example of the hollow cone type, is insertable within a corresponding aperture by a press fit. Spray angle S, which is the angle of each nozzle 20 with respect to the longitudinal axis of the nozzle unit, ranges from 0-75 degrees, and is preferably 45 degrees so as to provide a maximum starting diameter of the mist stream without resulting in dispersion thereof. Nozzle capacity of 5-50 liter/hr is sufficient for effective performance of the spray device according to the present invention.

When needed, such as when clogged, nozzle 20 may be removed and replaced. The nozzle unit, as well as the conduits through which the liquid to be sprayed flows, may be occasionally cleaned, e.g., by circulating an acidic liquid, such as vinegar or any other commercial acid, therethrough. The acid is introduced into the nozzle unit by a dosing pump and is circulated at a concentration of 5-20%, depending on the hardness of the water.

The nozzle unit is user-friendly and a nozzle is easily replaceable, so as to discharge droplets having a predetermined size, depending on the outlet size of a desired nozzle. When the meteorological conditions are such that the surrounding air is highly humid, for example, it is desirable to spray small-sized droplets for cow cooling.

Hose 18 is insertable within an aperture formed in circumference 33 and secured thereto. Liquid which flows within the hose is injected into nozzle unit 15 and is provided with centrifugal motion therewithin, such that when discharged from nozzle 20 forms conical spray pattern 36. The discharges from each nozzle converge slightly downstream to form mist stream 25 (FIG. 2). In this configuration, the size of each water droplet is on the order of 100 microns, and a typical size of the outlet diameter is 10.7 mm.

Figure 4B:
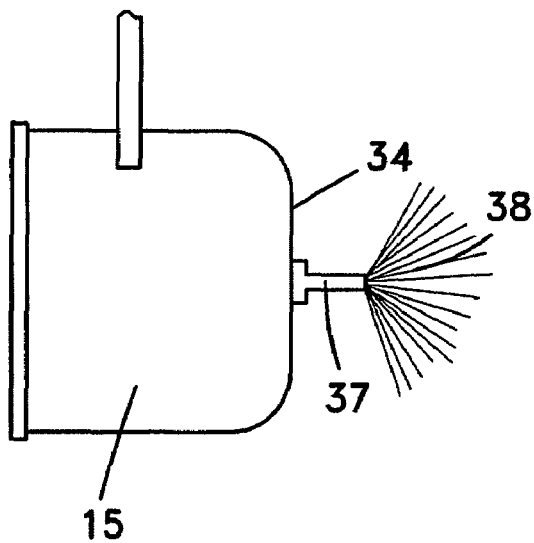

Alternatively, as shown in FIG. 4b, a single nozzle 37 may be inserted within front face 34 of nozzle unit 15, such that the spray angle is approximately 0 degrees with respect to the longitudinal axis of the nozzle unit. In this configuration, the size of each water droplet is on the order of a fraction of a millimeter, and a typical size of the outlet diameter is 2 mm. Conical spray 38 produces a spray with a larger dispersion than conical spray 36 so that the starting diameter of the mist stream is as large as possible, e.g. 10 mm, with effective usage of liquid.

Hereinafter, for purposes of description, reference will be made to cows as the target of the spray device and water as the liquid to be sprayed, but this should be understood to be a preferred example and not a limitation since this invention is suitable for the spraying of any liquid at any suitable targets such as overheated bears enclosed within a cage at a zoo or any other overheated animal, cars to be washed, textile fibers to be sprayed before processing, the enclosure of a greenhouse for increasing the moisture content thereof and for the application of insecticide to plants grown therein, etc.

Optimal cooling of cows will take place when the mist stream is produced intermittently. By closing the water inlet to the nozzle unit, cows will not be over-wet and water will be conserved. After a cow is wetted and the water inlet is closed, the air stream continues to flow so as to continue water evaporation and cooling from the cow. Check valve 14 (FIG. 1) may be employed during the cyclic operation of spray device 10, to ensure that water is readily available upstream of nozzle unit 15 and that a mist stream may therefore be immediately produced on demand.

To properly cool cows that are generally interspersed throughout a large area, namely in the feeding area, corral and waiting pen, a plurality of spraying devices need to be employed, each of which directs a controllable mist spray to a different location. An arrangement is shown in FIG. 5, in which a plurality of nozzle units 15, each of which is mounted on a different fan, receive water from a common water line 40 and discharge a spray from nozzles 20. Water line 40 subdivides into branches 41, such that each branch 41 supplies water to a corresponding spray device 10. The flow of water into water line 40 is regulated by valve 43.

Figure 6:
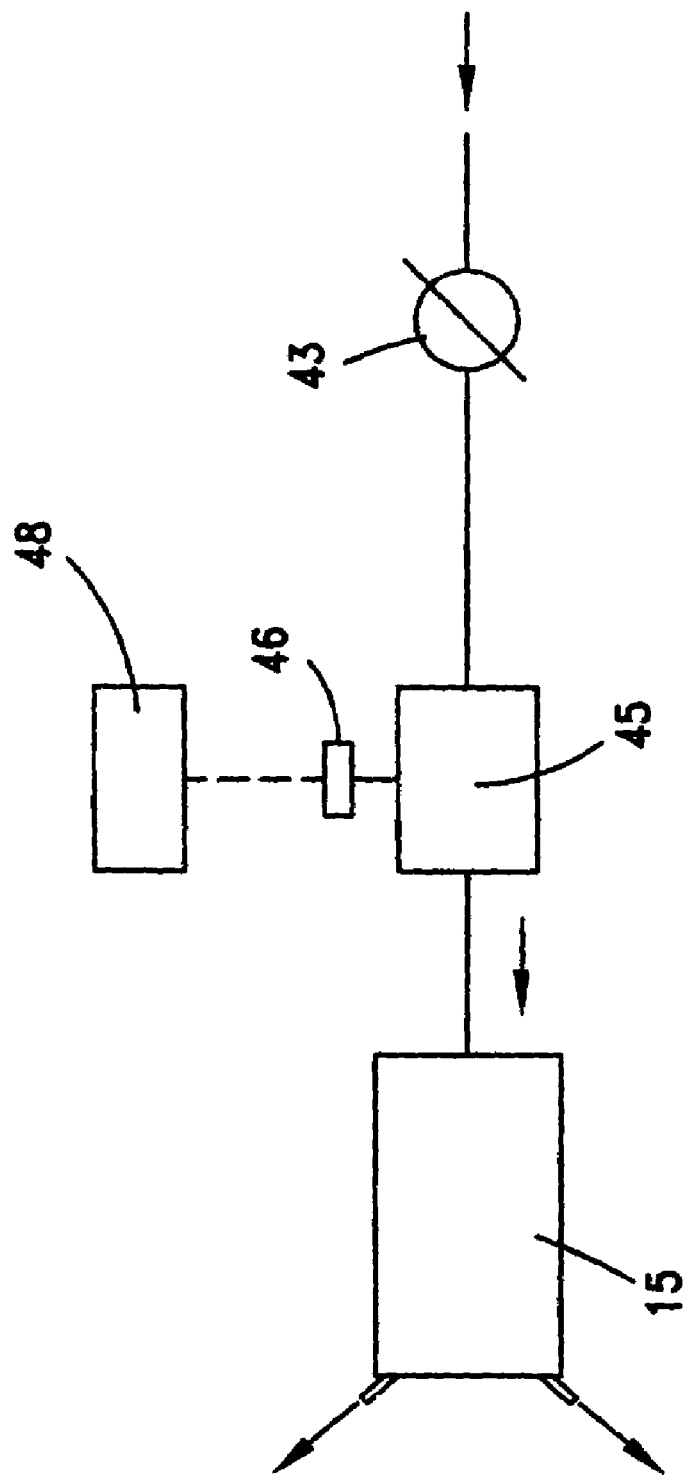
FIG. 6 is a schematic diagram of another preferred embodiment of the present invention in which a control valve is used to regulate the inflow of liquid into a spray device.

Another preferred embodiment of the spray device is illustrated in FIG. 6. The flow of water into nozzle unit 15 is regulated by control valve 45, so that water at a predetermined pressure is admitted therein for a predetermined duration. Timer 48 communicates with actuator 46, e.g. a solenoid actuator, of the control valve in order to maintain the cyclic operation of the spray device. After discharging a mist stream for a predetermined duration, timer 48 transmits a signal to close control valve 45, so that the air stream generated by the corresponding fan flows without propelling a mist stream. After a second predetermined duration, timer 48 transmits a signal to open control valve 45 again and to therefore generate a mist stream.

Figure 7:
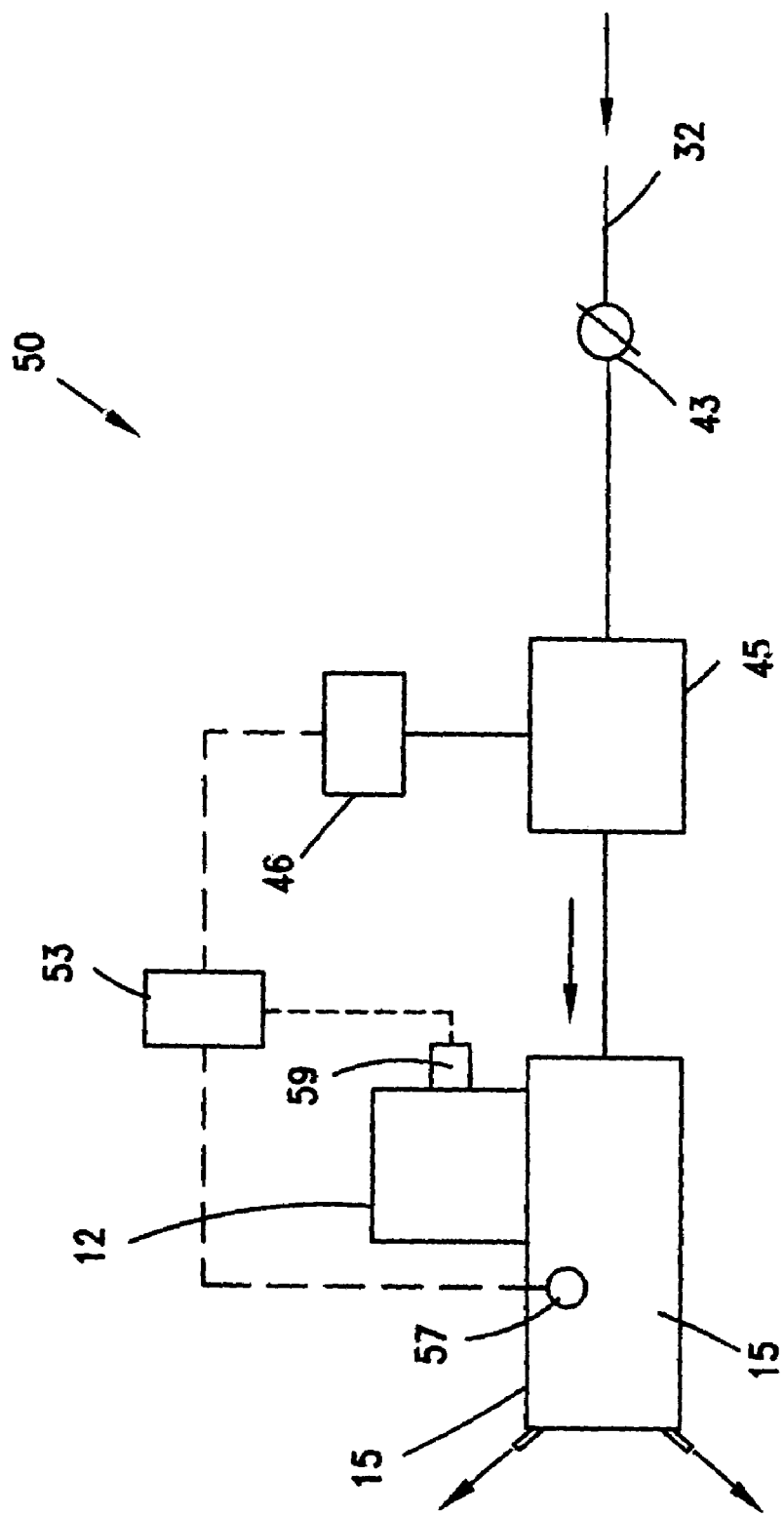
FIG. 7 is a schematic diagram of another preferred embodiment of the invention in which a single control valve and sensor are used.

Another preferred embodiment of the spray device is illustrated in FIG. 7. Spray device 50 includes controller 53, control valve 45 and singular sensor 57. Water flows into water line 32, after shutoff valve 43 has been opened, through control valve 45, when the control conditions enable such a flow as detailed hereinafter, and is injected into nozzle unit 15. Sensor 57 detects the ambient temperature and communicates with controller 53. Controller 53 in turn communicates with control valve actuator 46. When the sensed ambient temperature becomes greater than a predetermined low switch point, controller 53 commands control valve 45, by means of actuator 46, to allow water inflow. Similarly when the sensed ambient temperature becomes less than a predetermined high switch point, control valve 45 is commanded to prevent water inflow into nozzle unit 15. Alternatively, sensor 57 can be operative to sense the ambient wind velocity, such as an anemometer, wind vane or digital wind sensor. In conjunction with such a sensor, controller 53 commands control valve 45 to allow water inflow into nozzle unit 15 as the wind velocity is less than a predetermined value and to prevent water inflow as the wind velocity is greater than a predetermined value. Sensor 57 may also be a hygrometer, or any other instrument to sense the relative humidity. A mist stream will not enhance the cooling of a cow if the relative humidity is above a certain value since the entrained water particles will not be able to evaporate. It is advisable in such meteorological conditions to prevent the generation of a mist stream by closing control valve 45.

Controller 53 may also advantageously control the operation of fan 12. In response to one of the aforementioned types of sensors, controller 53 may control the operation of fan 12, i.e. activation/deactivation and rotational speed of the fan blades, by means of fan motor actuator 59, depending upon the value of the parameter sensed by sensor 57. Controller 53 commands the closing of control valve 45 shortly before deactivating the fan motor, so as not to cause any collection of water in the vicinity of the spray device, resulting from the discharge of water from nozzle unit 15 that does not form a mist stream. However, the fan motor can operate even though control valve 45 is closed, to provide a cooling effect by an air stream during a marginally warm day when a mist stream is not necessary, or alternatively during a very humid day when a mist stream is not helpful.

Figure 8:
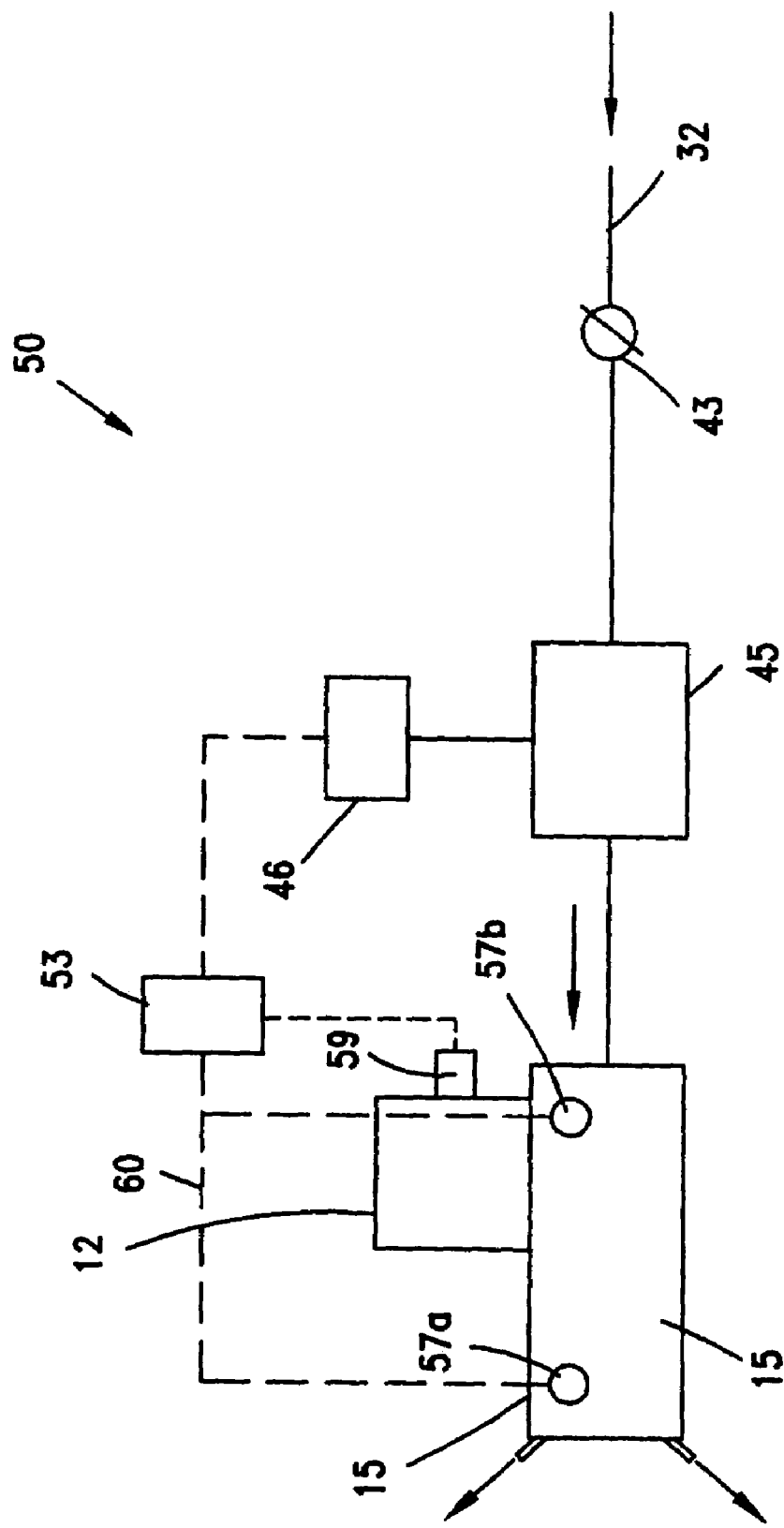
FIG. 8 is a schematic diagram of yet another preferred embodiment in which a controller and a plurality of sensors are employed to control the inflow of water into a spray device.

As shown in FIG. 8, spray device 50 may be provided with more than one sensor. Two sensors 57a and 57b are illustrated, but any other number nay be conveniently employed. Each sensor may be of a different type. For example, sensor 57a may be a hygrometer and sensor 57b may be a temperature sensor, since there is a need to generate an air stream without a mist stream during conditions of high humidity only when the ambient temperature is higher than a predetermined value. The set points and the sensitivity of each sensor are preferably determined in accordance with the selected design constraints. Controller 53 acquires the data input from each sensor, compares the relative values, processes the information, commands the actuator of control valve 43 to regulate the inflow into nozzle unit 15 and commands actuator 59 to control the operation of fan 12.

The construction of controller 53 is of course dependent upon the particular type of sensor used, as will be apparent to the skilled person. The controller, in a particular embodiment of the invention, comprises four sub-units: a microprocessor, software for programming actuators 46 and 59 in a preferred manner (which may, of course, be implemented by hardware), a local memory and a means of communicating with the actuators and sensors. These sub-units will also be easily apparent to the skilled person, and are therefore not described herein in detail, for the sake of brevity.

As is well known, a control valve is actuatable to admit a predetermined amount of water at a predetermined flow rate. Controller 53 receives input from sensors 57a and 57b via cable 60, or alternatively in wireless fashion, and in accordance with a predetermined program, and commands control valve actuator 46 to deliver water at a preferred pressure and flow rate and for a predetermined duration, depending on the input signals from the sensors, so that a preferred arrangement of the mist stream may be produced and efficient usage of water may be effected.

Figure 9:
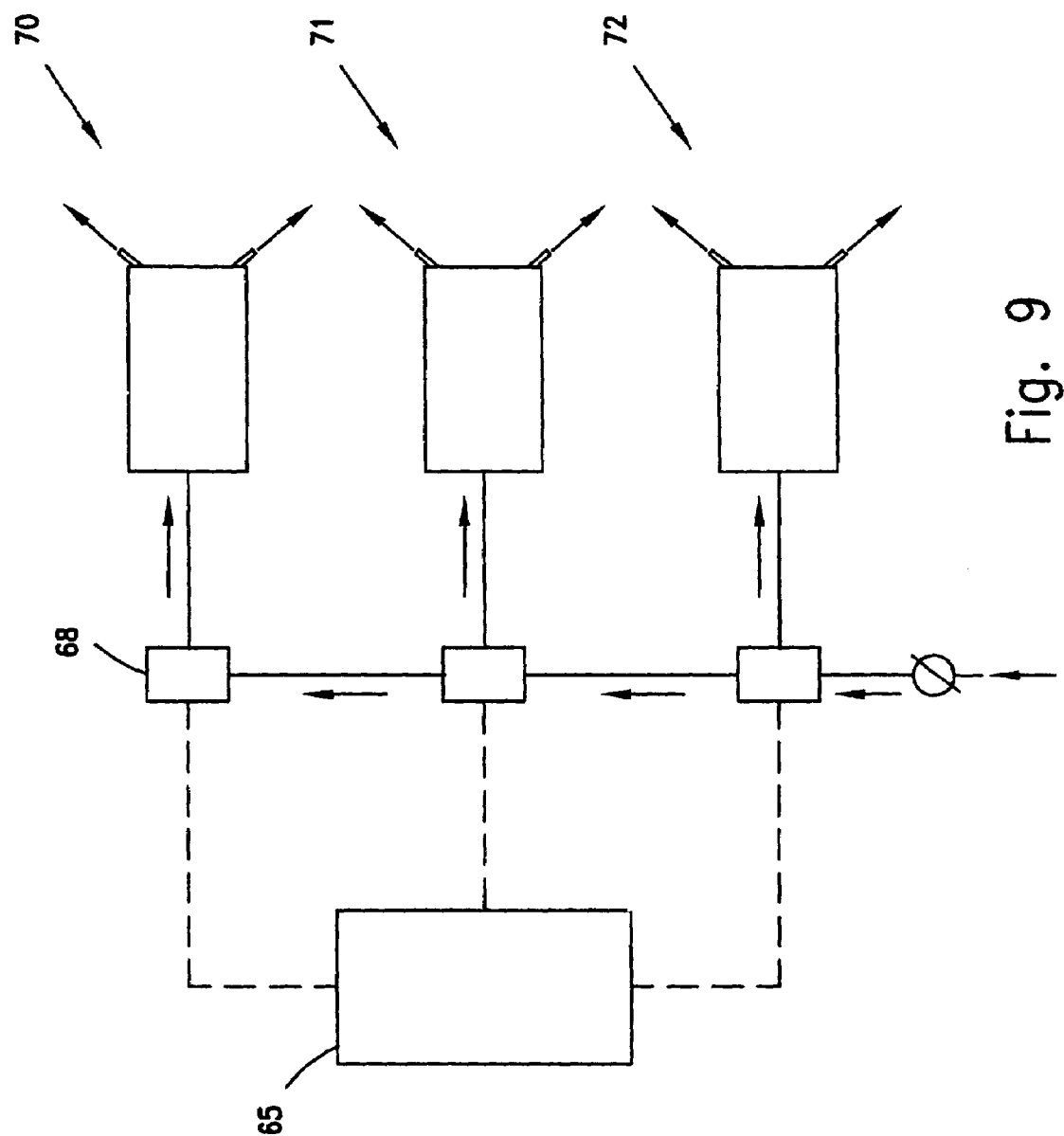
FIG. 9 is a schematic diagram of another preferred embodiment in which a controller controls the actuation of a plurality of control valves.

FIG. 9 illustrates another preferred embodiment in which controller 65 controls the actuation of a plurality of control valves 68. Each control valve 68 admits the inflow of water into the corresponding spray device 70, 71 and 72. The sensors of each set of containers communicate with controller 65, which determines, as a result of a selected program, whether a mist stream is to be produced, and if so, initiates a command to the corresponding control valve actuator to admit an additional amount of water. Preferably each control valve 68 admits water to the corresponding spray device at a different time, so that water at the optimal flow rate and pressure will be admitted thereto. If extenuating circumstances dictate that water has to be admitted to several sets of containers simultaneously, controller 65 commands the actuators to approximate the preferred operating conditions as much as possible. Of course, controller 65 also controls the operation of the corresponding fan motor, as described hereinbefore.

Figure 10:
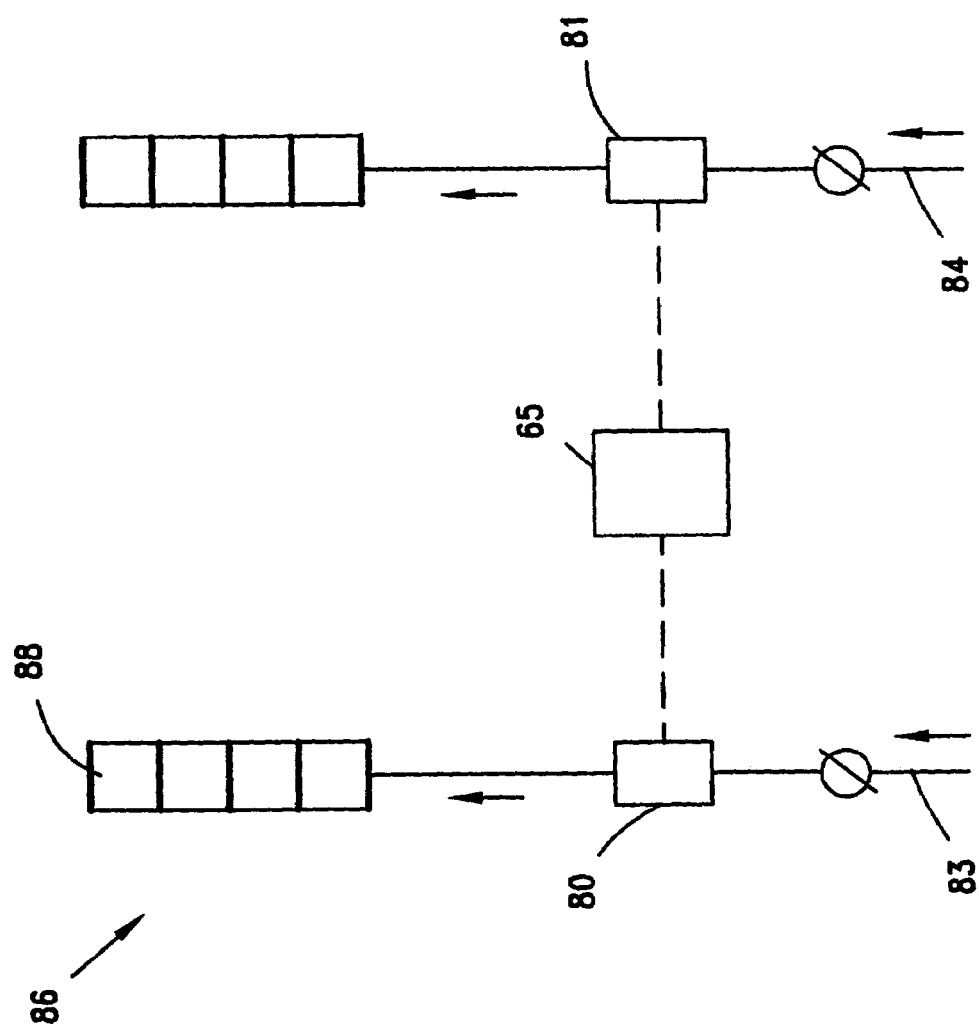
FIG. 10 is a schematic diagram of an additional embodiment of the present invention in which a controller controls the inflow of water into a plurality of sectors of spray devices from separate lines of liquid.

FIG. 10 illustrates another embodiment wherein controller 65 commands the actuation of two separate control valves 80 and 81, through which water flows from two separate water lines 83 and 84, respectively. With this configuration the water flow rate and pressure is sufficient to provide water for the spray devices of each sector 86, so that a mist stream may be directed at a target location separated a predetermined distance from the corresponding spray device. Each sector is comprised, for example, of four spray devices 88.

Figure 11:
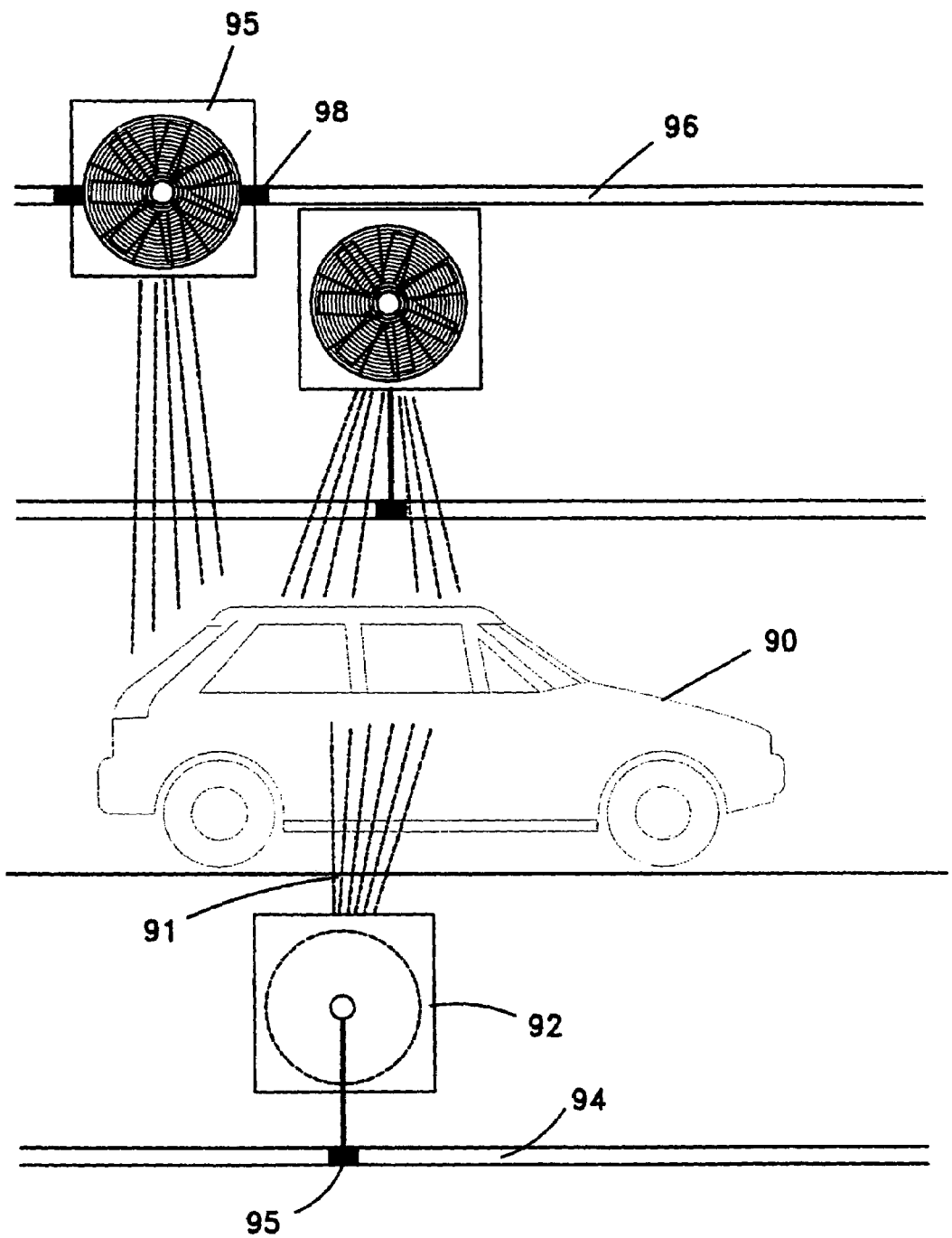
FIG. 11 illustrates one preferred embodiment of washing a motor vehicle with spray devices of the present invention.
Figure 12:
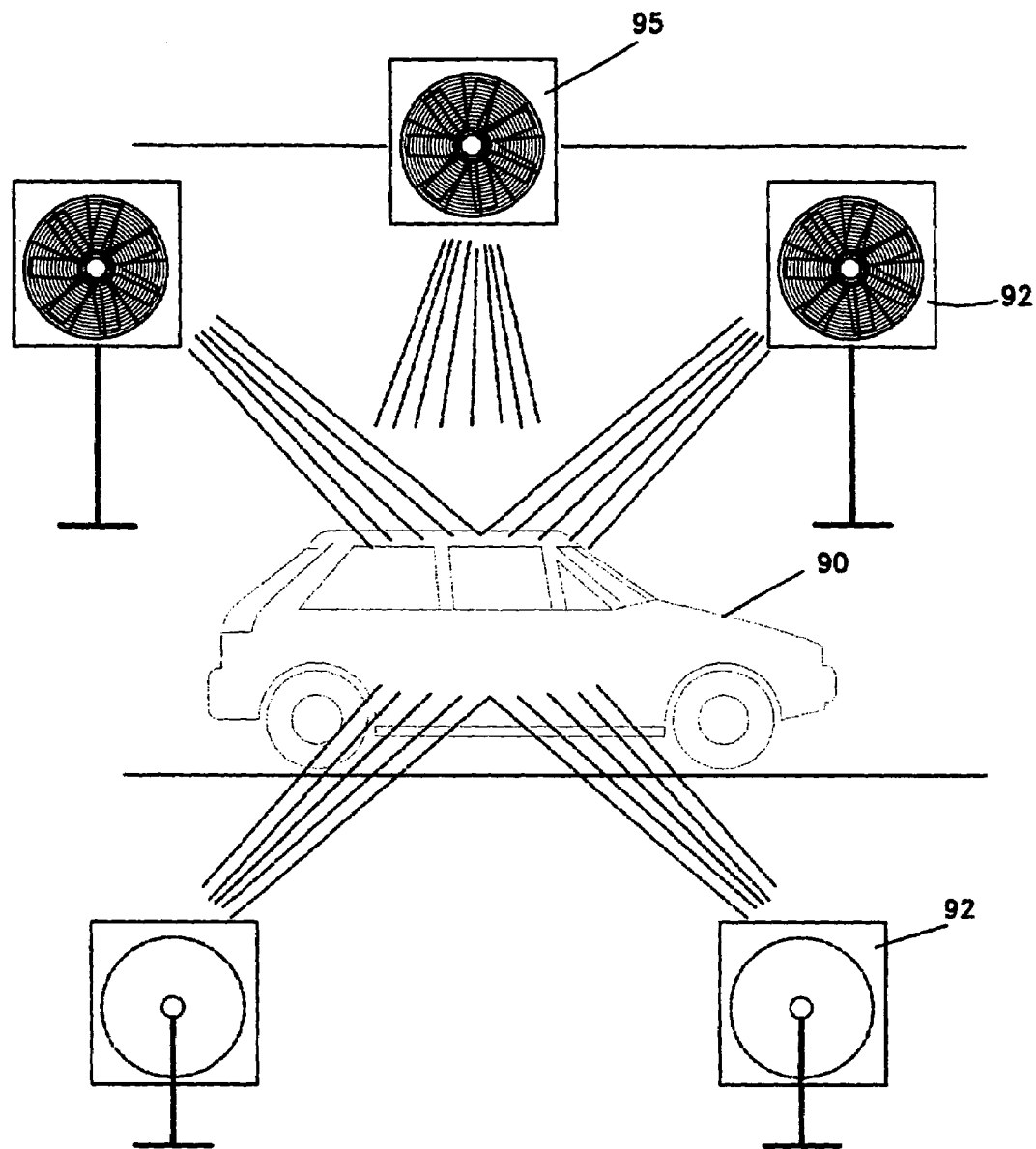
FIG. 12 illustrates another preferred embodiment of washing a motor vehicle with spray devices of the present invention.
Figure 14:
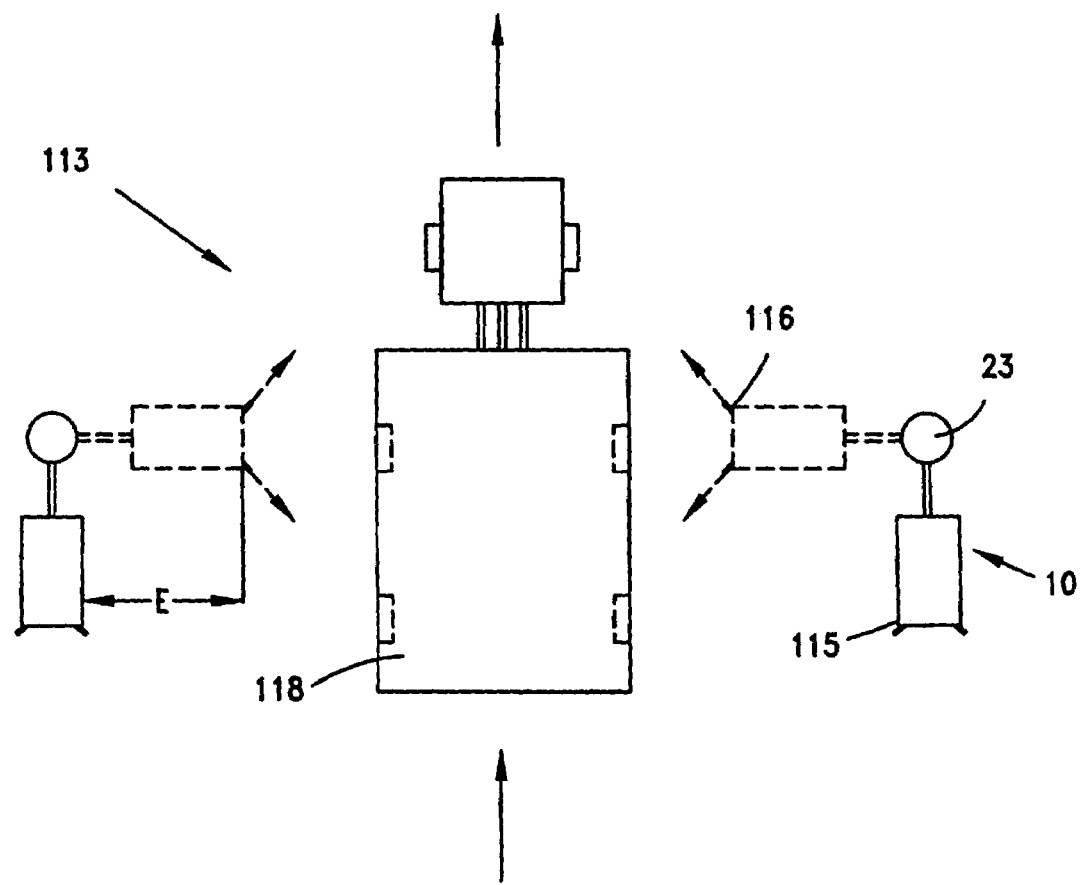
FIG. 14 is a schematic diagram of another preferred embodiment of the invention in which the radial position of a spray device with respect to a vertical post id adjustable.

FIGS. 11-13 illustrate another application of the spray device according to the present invention, namely the washing of a motor vehicle. The following description refers to the washing of a car, but it would be appreciated that it is equally advantageous to employ the present invention for the washing of any motor vehicle, such as a truck or a bus.

As shown in FIG. 11, car 90 is washed by means of longitudinally displaceable, i.e. in a direction toward the front and alternately to the rear of the car, spray devices 92 and 95. Two lower spray devices 92 are provided and are transversely spaced, i.e. in a direction perpendicular to the longitudinal direction, from each side of the car, respectively. The transversal spacing is selected so that the diameter of mist stream 91 is sufficiently large so as to be capable of moistening the entire height of car 90. The height of elevated spray device 95 is selected to allow for the moistening of the hood, as well as the front and rear windows.

Each spray device 92 is guided along a corresponding track 94. For example, the leg portion of the spray device is provided with a horizontal protrusion 95 that is insertable within, and engageable with, a recess formed within the track. A drive means (not shown) longitudinally displaces spray device 92 at a controlled rate, such that the spray device is displaced a length equal to at least the length of the car during a time interval equal to a predetermined period of time. As a result, the entire side of the car is moistened by mist stream 91 during the predetermined period of time. Likewise elevated spray device 95 is provided with a pair of guides 98 for engagement with track 96 and is displaceable by a corresponding drive means (not shown).

In order to effectively wash the car, the spray devices discharge a spray of different liquids in accordance with a predetermined cycle. After generating an air stream by a fan, or alternatively by any other feasible means such as a duct or a wind tunnel, the spray devices discharge a fine mist stream in order to moisten any dirt particles that have accumulated on the car body. A chemical solution is then admitted to the nozzle unit (FIG. 13), whereupon a mist stream comprising water and the chemical solution is propelled by the air stream and impinges upon the car. A foam is produced by the chemical solution and remains on the car body for a sufficient time which facilitates the dissolving of the dirt particles. The cleaning capability of the foam is enhanced by deactivating the air generating means and by preventing the flow of water and of the chemical solution. The car is then washed with a high-pressure mist stream, after which the water inlet is closed and the remaining water is dried by the air stream.

The chemical solution preferably is an aqueous solution comprising a compound selected from the group of surfactant, aliphatic alcohol, aminoalcohol, alkanol amide, sodium hydroxide, glycol ester, or a mixture thereof, for the production of a foam that facilitates the dissolving of dirt particles.

The car washing cycle may alternatively include a step of applying a mist stream of wax after the chemical solution is washed by the high-pressure stream. The wax remains on the car for a period of time, and then is dried by the air stream.

Car 90 may also be washed by a plurality of stationary spray devices, as illustrated in FIG. 12. Two lower spray devices 92 are provided at each side of the car, while each lower spray device is disposed at a predetermined transversal spacing therefrom so as to maximize the surface area being impinged by the given mist stream. The number of lower spray devices 92 that are employed preferably corresponds to the length of the car. Likewise at least one elevated spray device 95, and preferably two, are located at a sufficient distance from the car and are positioned at such an angle so as to impinge upon those sections of the car that are beyond the range of lower spray devices 92.

As shown in FIG. 13*a,* nozzle unit 101 has three separate inlets 102, 103 and 104 with three corresponding liquid circulation chambers (not shown) and three corresponding sets of nozzles 108, 109 and 110, respectively. For example, nozzles 108 are adapted for the low-pressure mist stream of water, nozzles 109 for the mist stream of chemical solution and nozzle 110 for the high-pressure mist stream of water. Another nozzle may be positioned next to nozzle 110 for the discharge of wax.

Another embodiment of the present invention is shown in FIG. 14, wherein the radial position of spray device 10 with respect to vertical post 23 is adjustable. By being able to adjust the radial position of a spray device, spraying area 113 may be utilized for a different desired application without interference from a spray device located in radial position 115, yet may be sprayed with a mist stream, in accordance with the present invention, when the spray device is located in second radial position 116. The maximum lateral displacement E of spray device 10 corresponds to an angular displacement of 90 degrees from first radial position 115 to second radial position 116.

In one desired application, cows may freely roam throughout a feeding area without interference from spray device 10, which is located in radial position 115. When the cows are to be sprayed, the spray device is revolved about post 23 until arriving at radial position 116, whereat a mist stream is generated. Another desired application involves the washing of wide-body truck 118. If spray devices 10 were in a permanent extended position, each of which is located at a different height and distance from the truck body, a truck driver may have difficulty in maneuvering truck 118 between the various spray devices, so as to maintain a proper clearance therefrom and to accordingly allow the lateral dimension of a corresponding mist stream to have an optimal value. Therefore each spray device 10 is at non-extended radial position 115 when truck 118 enters spraying area 113 and at extended radial position 116, as indicated by dotted lines, when a mist stream is generated. It will be appreciated that the radial position of each spray device may be adjusted.

Figure 15A:
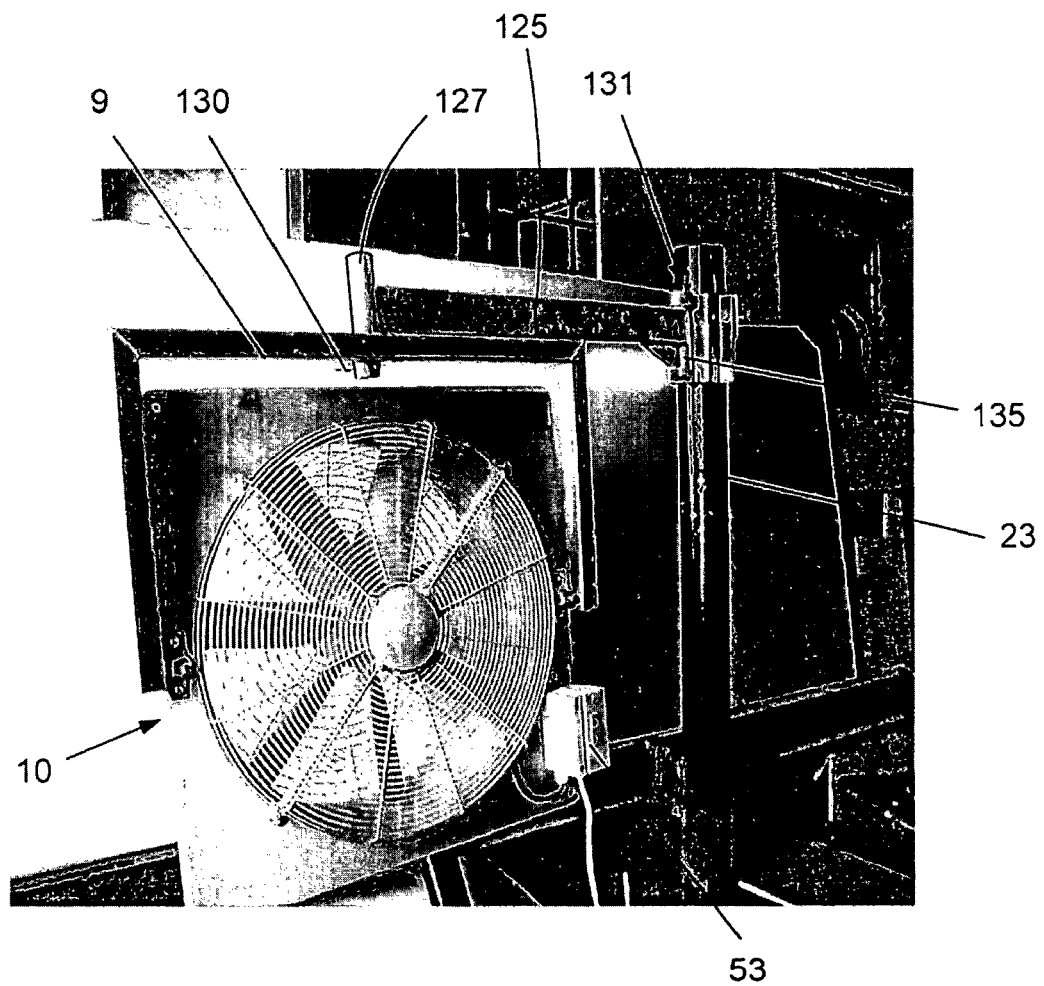
FIGS. 15a and 15b are pictures which show the swinging of a cross member that carries a spray device from a first radial position in FIG. 15a to a second radial position in FIG. 15b.

As shown in FIG. 15a, support 9 of spray device 10 is carried by cross member 125 as the latter is revolved about post 23. Support 9 is connected to cross member 125 by means of rod 127. The angular disposition of support 9 relative to cross member 125 may be adjusted by rotating the support about rod 127 and then securing screw 130, thereby fixing the angular disposition of support 9. A shaft assembly generally designated as 131 is adapted to allow cross member 125 to swing.

Figure 15B:
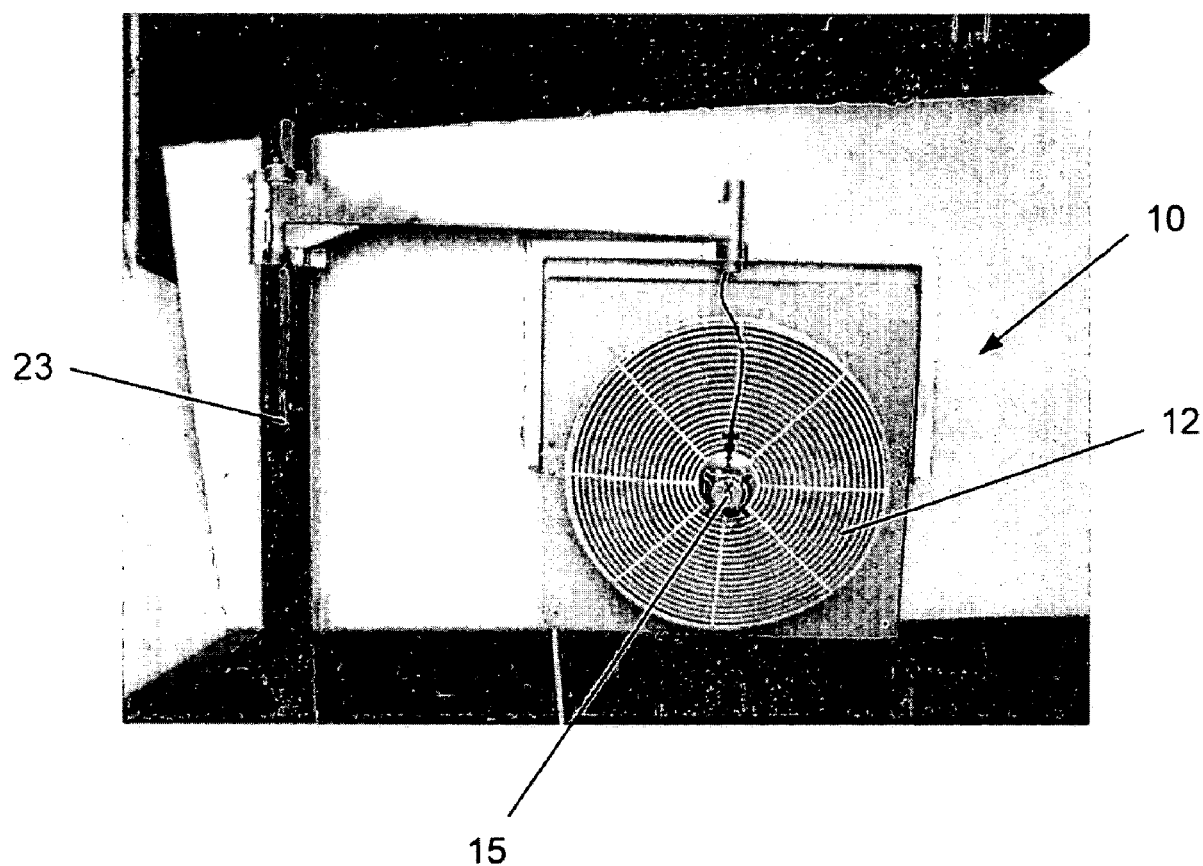

FIG. 15b is a picture of spray device 10 which has swung a radial displacement of 90 degrees relative to post 23. Upon generation of an air stream by fan 12, the air stream develops a pressure corresponding to the air velocity at the fan outlet. Due to the pressure differential between the outlet and inlet of fan 12, a force is directed towards the fan and causes cross member 125 to swing in a counterclockwise direction. After spay device 10 has been displaced to a desired radial position, a mist stream is then generated from nozzle unit 15. By example, a limit switch (not shown) detects when the desired radial position has been achieved, and then communicates with controller 53 (FIG. 15a) to transmit a signal commanding the injection of water into the air stream.

Figure 16:
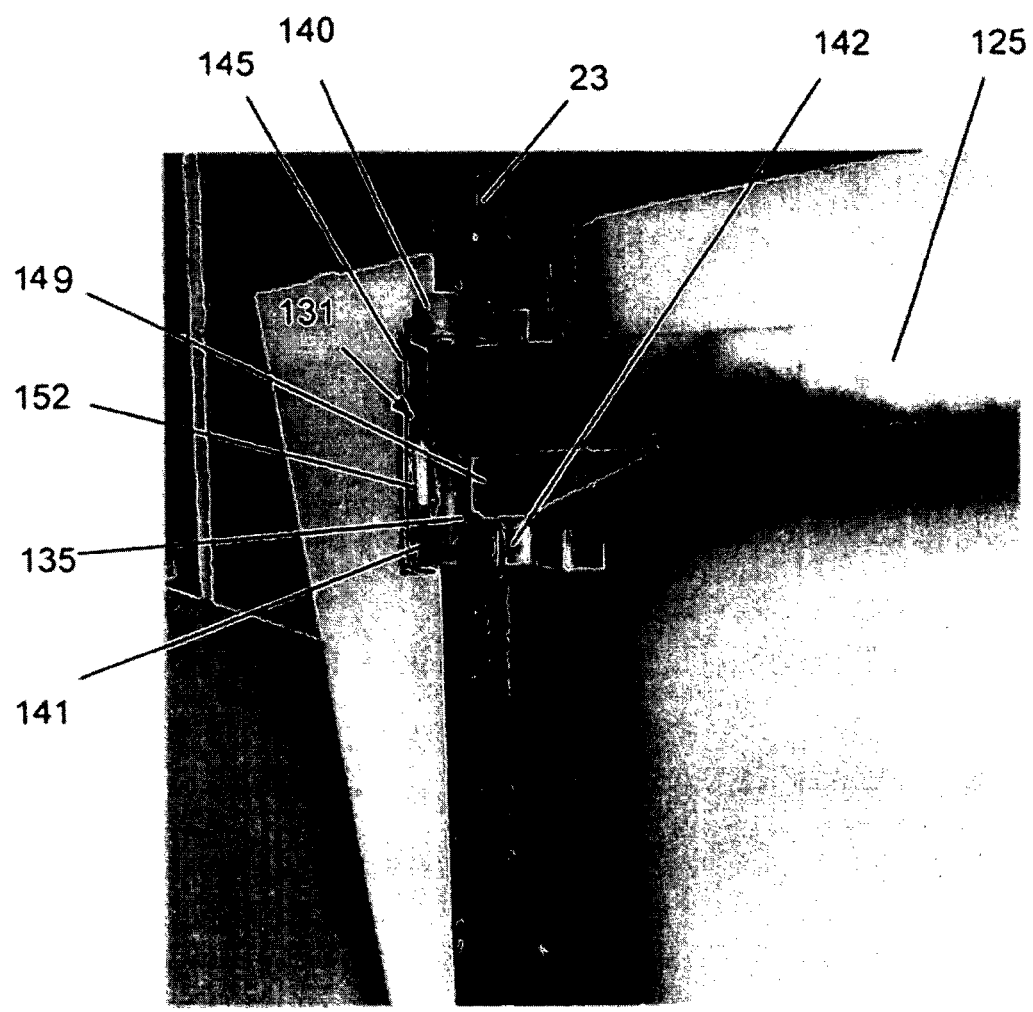
FIG. 16 is a picture of a shaft assembly coupled to a swingable cross member.

FIG. 16 is a picture of shaft assembly 131. Shaft assembly 131 comprises shaft 135, two corrosion resistant balls (not seen), and caps 140 and 141 which cover and contact a corresponding ball. Caps 140 and 141 are affixed to planar face 142 of rectilinear mount 145, e.g. by welding or by bolts threaded internally to the corresponding cap. Mount 145 is mounted on post 23 in any convenient way well known to those skilled in the art, and serves to support cross member 125, as well as to limit the extent of its swinging.

Cross member 125 has a rectangular cross section and each of its longitudinal ends terminates with a cylinder welded thereto. A first cylinder is annular and serves as rod 127 (FIG. 15a). The second cylinder is solid metal and serves as shaft 135, allowing cross member 125 to swing. As cross member 125 swings, resulting from a pressure differential-based force, shaft 125 rotatingly contacts the balls which are housed and supported by a corresponding cap 140.

Cross member 125 is provided with contact plate 149, which partially covers shaft 135. The angular displacement of cross member 125 is determined by the point at which plate 149 contacts mount 145. The illustrated curvilinear shape of the plate allows for an angular displacement of 90 degrees, when plate 149 is essentially parallel to face 142. The shape of plate 149 and of face 142 may be advantageously modified so as to provide for a different angular displacement. For example, if a portion of plate 149 is partially removed, the plate may be adapted so as not to contact face 142, and the angular displacement may be greater than 90 degrees. Likewise face 142 may be provided with a protrusion, such that plate 149 will contact the protrusion at a point whereat the angular displacement is less than 90 degrees.

Caps 140 and 141 are affixed to post 23 in such a way that shaft 135 is off-line with respect to the axis of post 23, at an inclination of approximately 15 degrees, whereby the outer wall of top cap 140 not facing post 23 is more separated from the post than that of bottom cap 141. Due to this inclination, the end of cross member 125 adjacent to rod 127 (FIG. 15a) is lower than the end adjacent to shaft assembly 130 when the fan is not operating and is higher than it when the fan is operating, causing the cross member to swing, as described hereinabove. Consequently, when the fan ceases to operate, eliminating the pressure differential, the end of cross member 125 adjacent to rod 127, which is higher than the end of cross member 125 adjacent to shaft assembly 130, moves downwards due to gravity. Since cross member 125 is coupled to shaft 135 (FIG. 15a), a downward movement of the end adjacent to rod 127 causes the cross member to swing in a clockwise direction, until stopper 152 attached to the outside wall of the second cylinder contacts face 142.

If desired, the support of the spray device may be fixed in place, while the fan may rotate about the support in any desired degree of freedom. Accordingly, when the fan is operated and a pressure differential develops, the fan will rotate in the desired degree of freedom due to the pressure differential-based force.

The following examples illustrate several uses of the spray devices of the invention.

EXAMPLE 1

Cooling of Cows

A nozzle unit having four nozzles is employed. Each nozzle is equidistantly spaced from an adjacent nozzle and disposed at a spray angle of 45 degrees. The diameter of a circle formed by the nozzles is 10 cm. An exemplary nozzle is the Dan Fogger 7800, manufactured by Dan Sprinklers Ltd., Israel.

The fan that generates the air stream is Model Z-A, manufactured by Ziehl-Abegg, Germany. The diameter of the fan blades is 50 cm and the velocity of the air stream is 7 m/sec at an operating speed of 1400 rpm. With a water pressure of 4 atmospheres, a mist stream is produced having an ending diameter of 4 meters at a distance of 10 meters from the nozzle unit. With a fan blade diameter of 63 cm and an air stream velocity of 7 m/sec at an operating speed of 900 rpm, a mist stream is produced having an ending diameter of 6 meters at a distance of 12 meters from the nozzle unit. With a fan blade diameter of 63 cm and an air stream velocity of 9 m/sec at an operating speed of 1400 rpm, a mist stream is produced having an ending diameter of 7 meters at a distance of 16 meters from the nozzle unit.

EXAMPLE 2

Cooling of Cows with Multiple Spray Devices

Each nozzle unit is provided with four nozzles having a spray angle of 45 degrees. The effective diameter of the nozzles is 10 cm. The inflow to each nozzle unit is regulated by a separate control valve.

Three elevated fans at a height of 3 meters are used, with one nozzle unit on each fan. One fan having a blade diameter of 63 cm is located in the waiting yard of the dairy farm and is operated at a rotational speed of 1400 rpm. A mist stream is produced having an ending diameter of 7 meters at a distance of 16 meters from the nozzle unit through which water flows at 28 L/hr. The second fan, which is located in the feeding area, has a blade diameter of 50 cm and is operated at a rotational speed of 1400 rpm. A mist stream is produced having an ending diameter of 4 meters at a distance of 12 meters from the nozzle unit through which water flows at 28 L/hr. The third fan, which is located in the corral, has a blade diameter of 63 cm and is operated at a rotational speed of 900 rpm. A mist stream is produced having an ending diameter of 6 meters at a distance of 14 meters from the nozzle unit through which water flows at 7 L/hr.

The three spray devices communicate with a common controller, such that the mist stream of each corresponding spray device is generated for a duration of 0.5 minutes once in five minutes in response to a main timer.

EXAMPLE 3

Spraying of Perfume

Perfume at a concentration of 2% with a trade name "Fragrancs," manufactured by Frutarom Ltd., Israel, having a density of 0.9 gm/ml is sprayed within a wedding hall having an area of 100 $m^2$. 6 spray devices are employed, and each spray device is provided with a nozzle unit having 4 nozzles. Each nozzle is equidistantly spaced from an adjacent nozzle and disposed at a spray angle of 45 degrees. The effective diameter of the nozzles is 10 cm. A fan having a blade diameter of 50 cm is constantly operated at a rotational speed of 1400 rpm. A mist stream is produced having an ending diameter of 7 meters at a distance of 12 meters from the nozzle unit. The perfume flows at a pressure of 2 atmospheres and the particles which are discharged from the nozzle unit have a mean diameter of a fraction of a millimeter.

EXAMPLE 4

Car Washing

Two displaceable lower spray devices positioned at a height of 0.5 meters above ground level are used at a relative transversal spacing of 6 meters, one on each side of the car. The fans of lower spray devices have a blade diameter of 630 mm and are operated at 900 rpm. One displaceable elevated spray device at a height of 4 meters is used, and its fan having a rotational speed of 1400 rpm is provided with a blade diameter of 500 mm. Each nozzle is equidistantly spaced from an adjacent nozzle and disposed at a spray angle of 45 degrees. The diameter of a circle formed by the nozzles is 10 cm.

The chemical solution, which is delivered to the nozzle unit at a flow rate of 7 liters/hr is "Zohar Car Foamer" manufactured by Zohar Ltd., Israel with a viscosity of 5 cp and is diluted at a concentration of 5%. This solution comprises anionic surfactant, ethanol amine and butyl glycol.

A mist stream of water is produced for 1 minute, then a mist stream of chemical solution is produced for 0.5 minute, then the foam remains for 5 minutes on the car without any air stream or mist stream, then a water stream having pressure of 7 atmospheres is delivered at a flow rate of 28 liters/hr for 2 minutes and finally the water is dried by an air stream for five minutes. A KP 60/12 M pump, manufactured by Viking Pump, Inc. USA is used to deliver the chemical solution and high-pressure water. A microprocessor-based controller is used to synchronize the operation of each spray device and of the various motors which longitudinally displace each corresponding spray device, in order to wash a car according to the aforementioned cycle

EXAMPLE 5

Adjusting the Radial Position of Multiple Spray Devices

Four spray devices are employed to spray cows within a feeding area. The air stream for each spray device is generated by a fan manufactured by Ziehl-Abegg AG, Germany (Model FC-056-4D-6Q), having an air capacity of 9300 cfm and a velocity of 20 m/sec, so that a mist stream may be directed to a distance of 16 m.

Each spray device is rotatable by means of a cross member having a length of 96 cm and a 40-mm diameter shaft welded thereto. Two chrome-nickel balls with a diameter of 10 mm are seated above and below the shaft, respectively, and rotatingly contact a corresponding cap of 65 mm OD, which is welded to the mount of the shaft assembly. Each cross member rotates an angular displacement of 180 degrees, so that in the morning hours a mist stream may be directed to cows located in one shady area and in the afternoon may be directed to another shady area to which the cows walked following the movement of the sun.

Each cross member is connected to a steel cable which is driven by a gear motor, such as Model 1.75SPD manufactured by Automation for Agriculture Inc, Israel, providing a tensile force of 80 N/m.

Figure 17:
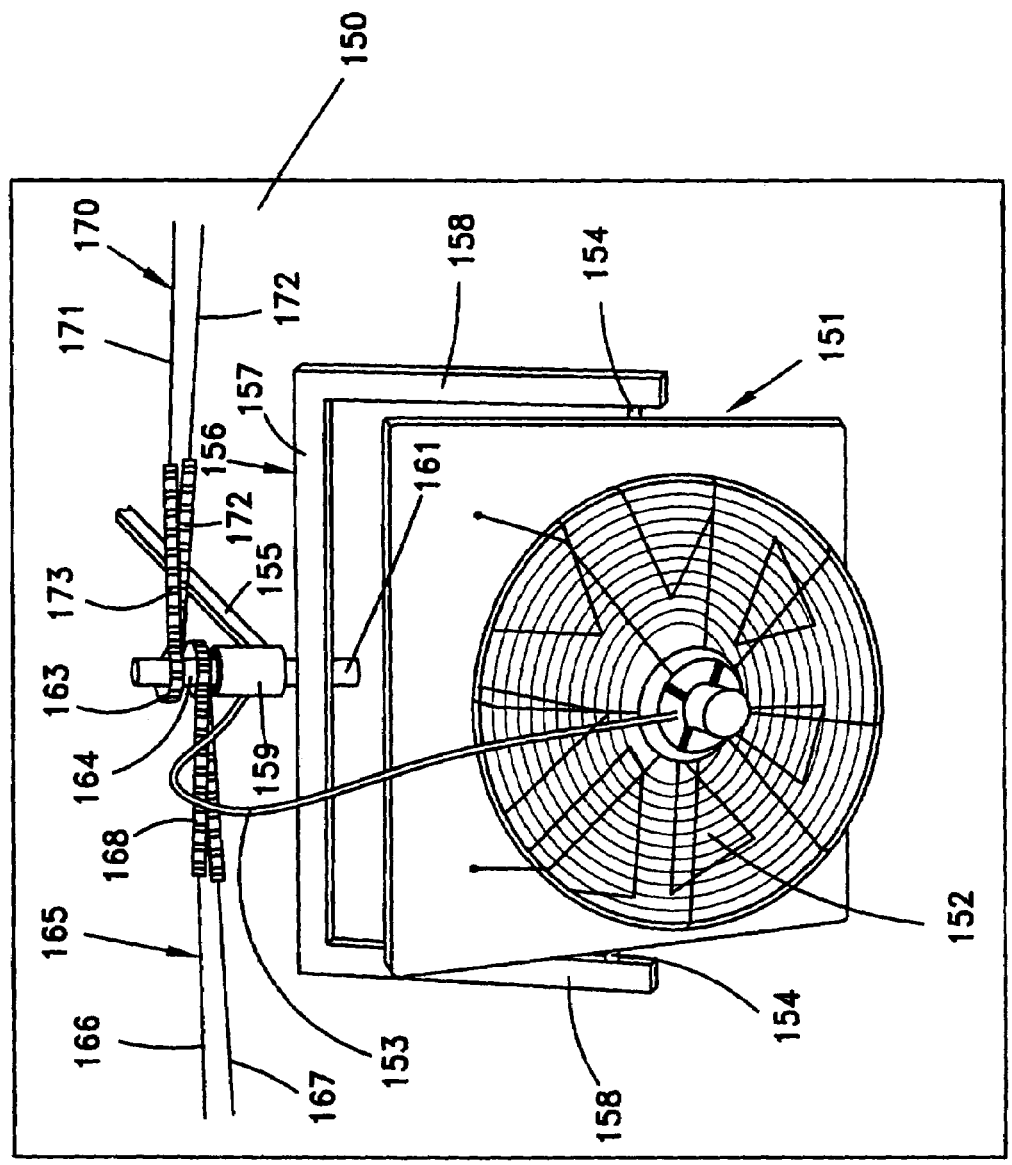
FIG. 17 is a front view of a spray device rotatable about a vertical axis, according to an embodiment of the invention.
Figure 18:
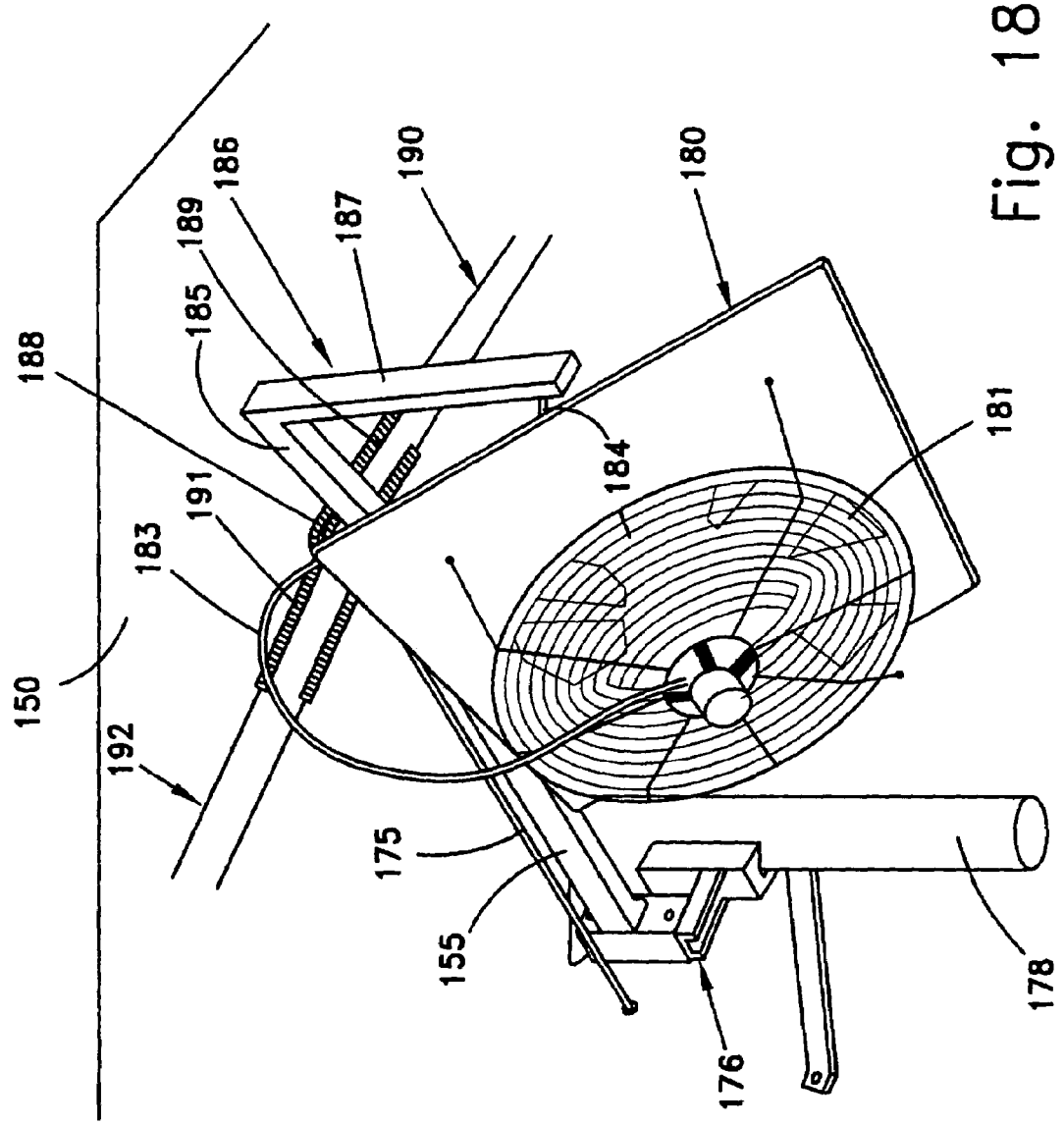
FIG. 18 is a perspective view of the spray device of FIG. 17 in another angular position.

The following figures refer to the cooling of cows in a shed. In FIGS. 17 and 18 numeral 150 indicates a static element of the shed, which can be a partition or a wall but could also be an open structure through which the water sprays can pass if the direction of the sprayers is reversed.

The sprayer is generally indicated at 151, mounted at a convenient height on static element 150, in the way hereinafter described, and slanted downwards as required in order to obtain the desired range of the water spray, taking into account the said height. Sprayer 151 comprises a fan 132 and a water inlet through a water feed pipe 153, which, as seen in FIG. 18, may be fed from a water main 175. The sprayer is mounted on, and is angularly displaceable about, horizontal pivot means, which may consist of two pivots 154 or of a horizontal rod. The pivots or rod define the bottom side of a rectangular support 156, which also includes an upper horizontal side 157 and two vertical lateral sides 158. Said rectangular support, of course, is only an example and differently shaped supports may be used. Upper side 157, and therefore support 156 is solid with a shaft 161. Said shaft 161 is rotatably mounted in sleeve 159 which is attached to an arm 155, supported by structure element 150, which keeps sprayer 151 at such a distance from component 150 that said sprayer may be rotated about a vertical axis as desired, even by 180 degrees. Arm 155 is shown as broken off in FIG. 17, but in FIG. 18 a way is shown of supporting it from structure element 150. In FIG. 18, 180 indicates a sprayer such as sprayer 151 of FIG. 17, and 184, 185, 187, 190 and 191 indicate respectively the same elements as 154, 157, 158, 170 and 165 of FIG. 17. Arm 155 is rigidly connected to a support 176, which in turn is connected to a sleeve or like hollow member indicated at 179, attached to structure element 150, through which wires or other connections can pass and be guided. However, this is only an example of a way in which arm 155 can be supported by structure element 150 and many other supporting ways may be devised by skilled persons and implemented in carrying the invention into practice.

Structure element 150 besides being vertical or substantially vertical, such as a partition or wall, could be horizontal or substantially horizontal, such as a ceiling. The supporting structure of FIGS. 17 and 18 would be equally applicable for supporting a sprayer, normally oriented with its axis vertical or slanted by an acute angle from the vertical, the various elements thereof being suitably dimensioned, as skilled person could easily dimension them.

As has been said, shaft 161 is rotatably mounted in sleeve 159. Any suitable means, not visible in the drawing, is provided for preventing said shaft from sliding along and/or out of said sleeve, e.g. a preferably annular projection can be formed around shaft 161 and engage a preferably annular seat in the inner surface of sleeve 159, or such a projection can be formed around the inner surface of said sleeve and engage a corresponding seat formed on the surface of said shaft. Shaft 161 carries an upper gear wheel 163 and a bottom gear wheel 164. A two-way flexible member is generally indicated at 165, and comprises two legs 166 and 167. It also comprises a gearing 168, viz. a row of gear teeth, positioned where it meshes with bottom gear wheel 164. The other end of member 165 is not seen in the drawing, but is similar to the end of two-way flexible elements 170 that will now be described and has a gearing, viz. a row of gear teeth, which meshes with the gear wheel carried by the preceding sprayer shaft, or, if the sprayer shown is the first, it engages an element of a control station, as will be hereinafter described with reference to FIG. 19.

Two-way flexible member 170 comprises legs 171 and 172 and gearing 173. Gearing 173 meshes with the upper gear wheel 163 of shaft 161 of the illustrated sprayer. When said shaft is rotated, gear wheel 163 causes one of the legs 171-172 to be drawn in and the other leg to be paid out. Two-way flexible member 170 meshes with a gear wheel on the shaft of the next sprayer, which is not seen in the drawing. Therefore, if sprayer shaft 161 is rotated by a certain angle, the shaft of the next sprayer will be rotated by the same angle, and the said rotation will be transferred from one sprayer shaft to the following one, all along the row of sprayers. If a sprayer is missing, but a shaft similar to a sprayer shaft is present, the rotation will be transmitted in the same way.

At the control station means are provided for supporting the first two-way flexible member and for displacing said member to draw one leg in and pay the other leg out. The simplest way to provide this, is to set at the control station a shaft carrying a gear wheel and to provide means for manually or mechanically rotating said shaft by the desired angle, whereby to rotate all the sprayers about their vertical axis. No flexible member need be provided after the last sprayer.

Figure 19:
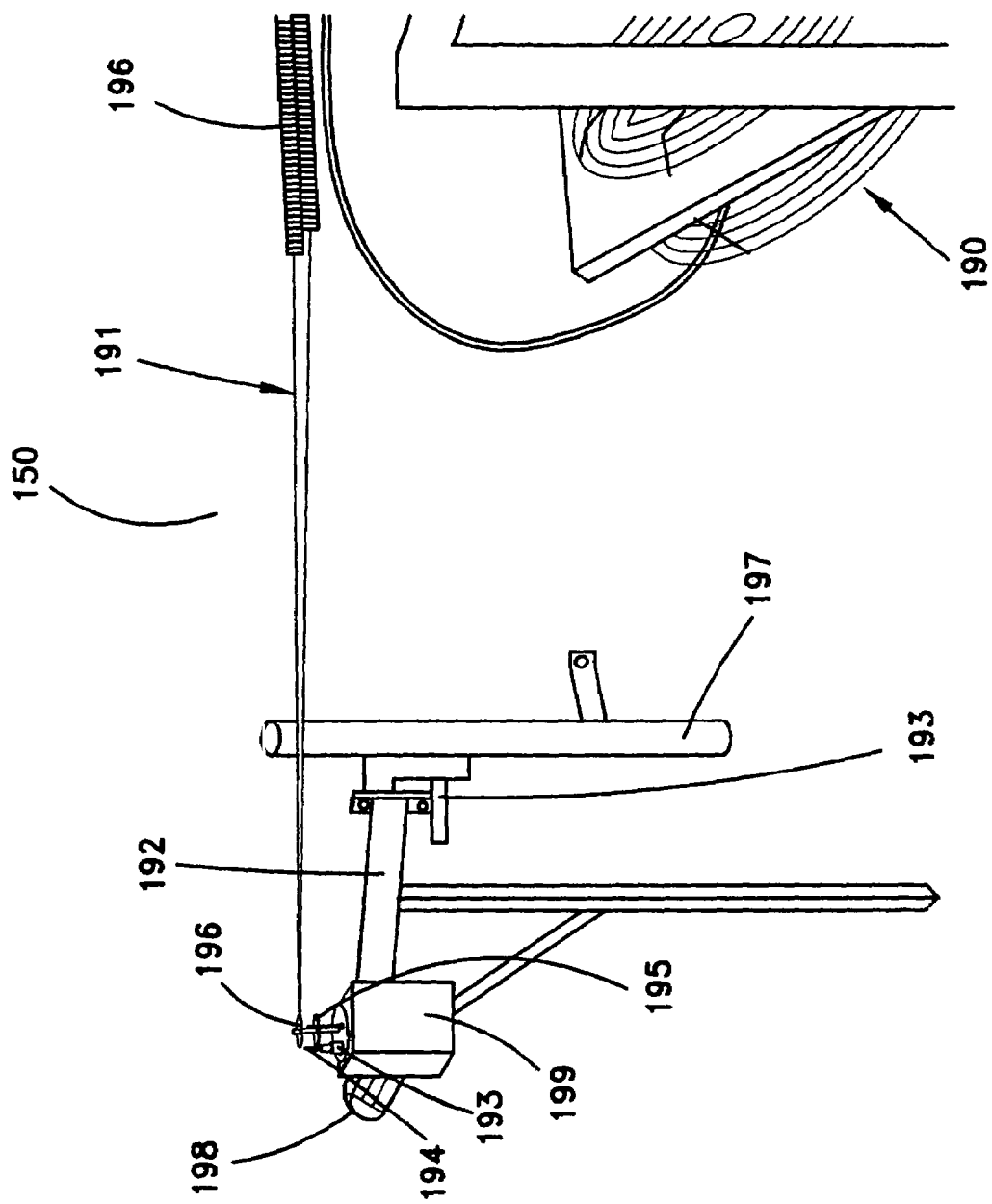
FIG. 19 illustrates the connection between the control station and the first sprayer according to a first embodiment of the present invention.

FIG. 19 illustrates shows an embodiment of the connection of the first sprayer, generally indicated at 190, with a control station. However, FIG. 19 could equally illustrate the connection between two successive lines of sprayers, set at an angle from one another and functionally coordinated. The control station illustrated comprises an arm 192 supported on structural element 150 in any convenient way. In the example illustrated, arm 192 is supported by a rigid connection 193, which in turn is attached to sleeve 197, similar to sleeve 178 of FIG. 18, which is attached to structural element 150. A two-way flexible member 191 carries two gearings, viz. rows of gear teeth, 196. Arm 192 supports a motor 198. Housing 199 houses a gear transmission from the shaft of said motor 198 to a shaft 193 to which is keyed a gearwheel 194. Gear wheel 194 meshes with a gear 195 keyed to a shaft to which is keyed a wheel 196. Wheel 196, if it is a gear wheel, meshes with a gearing not shown carried by flexible member 191, or, if it is not a gear wheel, has a frictional contact with said member, and therefore, when it rotates, flexible member 191 is displaced along itself, viz. one of its legs is drawn in and the other is paid out. Flexible member 191 displaces sprayer 180 (only partially seen) in the way previously described in connection to FIGS. 17 and 18. Other means, in general any convenient means, could be used to displace flexible member 191 by drawing in one leg thereof and paying the other leg out. For instance, a wheel corresponding to wheel 196 could be rotated manually, through a lever or in any other way. Housing 199 also conveniently contains the control processor which controls the operation of the apparatus according to the relevant parameters, comprising the parameters of the wind.

Figure 20:
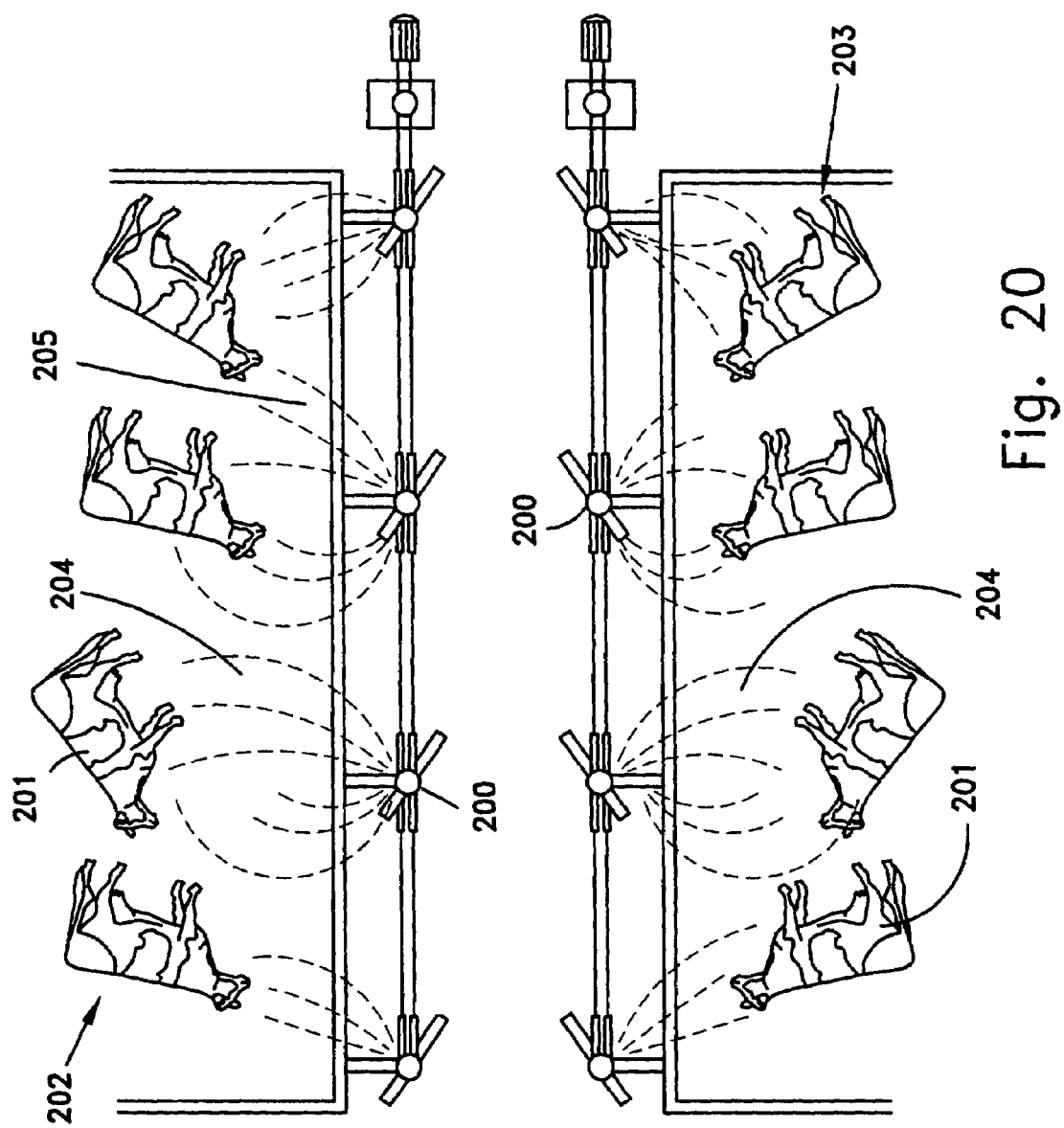
FIG. 20 is a schematic plan view illustrating the application of the invention to two parallel rows of cows in a shed.
Figure 21:
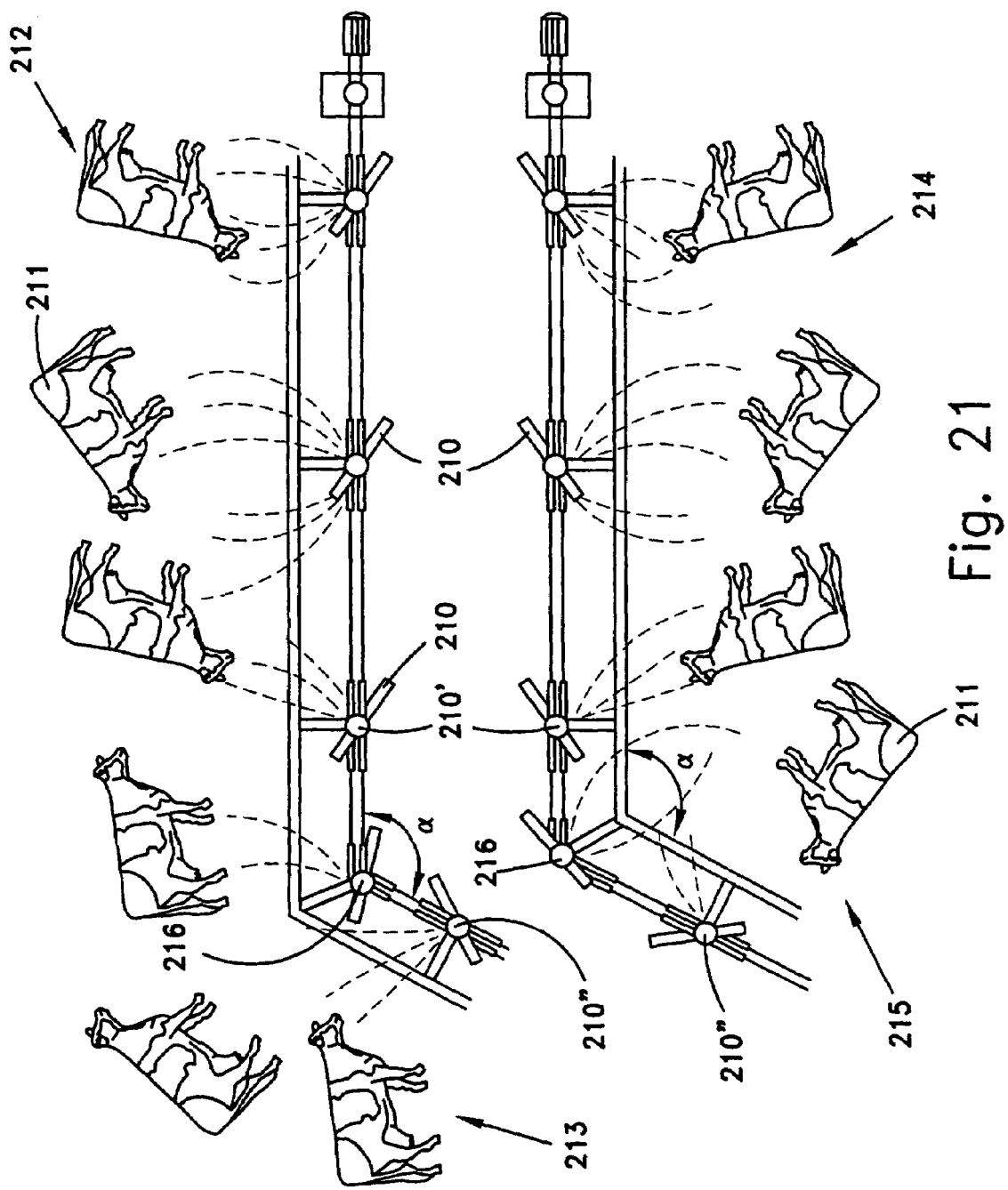
FIG. 21 is a schematic plan view illustrating the application of the invention to two row of cows at an angle to one another in a shed.

FIG. 20 schematically shows the operation of a row of sprayers 200 in a shed wherein the cows 201 are arranged in two opposite, straight rows 202 and 203. In the situation of FIG. 20 no wind is blowing, or the wind is so weak to have no influence on the water sprays. Therefore each sprayer 200 produces a spray 104 which reaches one of the cows 201, though it may exceptionally also reach second cow, as shown at 205. FIGS. 20 and 21 are plan views; however, for the sake of illustration, the cows are shown as they would be seen in vertical and not in plan view.

FIG. 21 shows a similar situations for a shed in which the cows 211 are arranged in two opposite rows each of which comprises a pair of segments 212-213 and 214-215 respectively, the segments of each pair forming an angle a between them. Sprayers 210 are arranged correspondingly in two rows, and each row comprises two segments which form the same angle α between them. At the point where the two segments of each row meet, is placed a sprayer 216 which transmits the angle of displacement from the preceding sprayer 70' to the following sprayer 70". In place of sprayer 156, if said sprayer is not requested to spray a cow, a shaft should be placed to transmit said angle of displacement.

Figure 22:
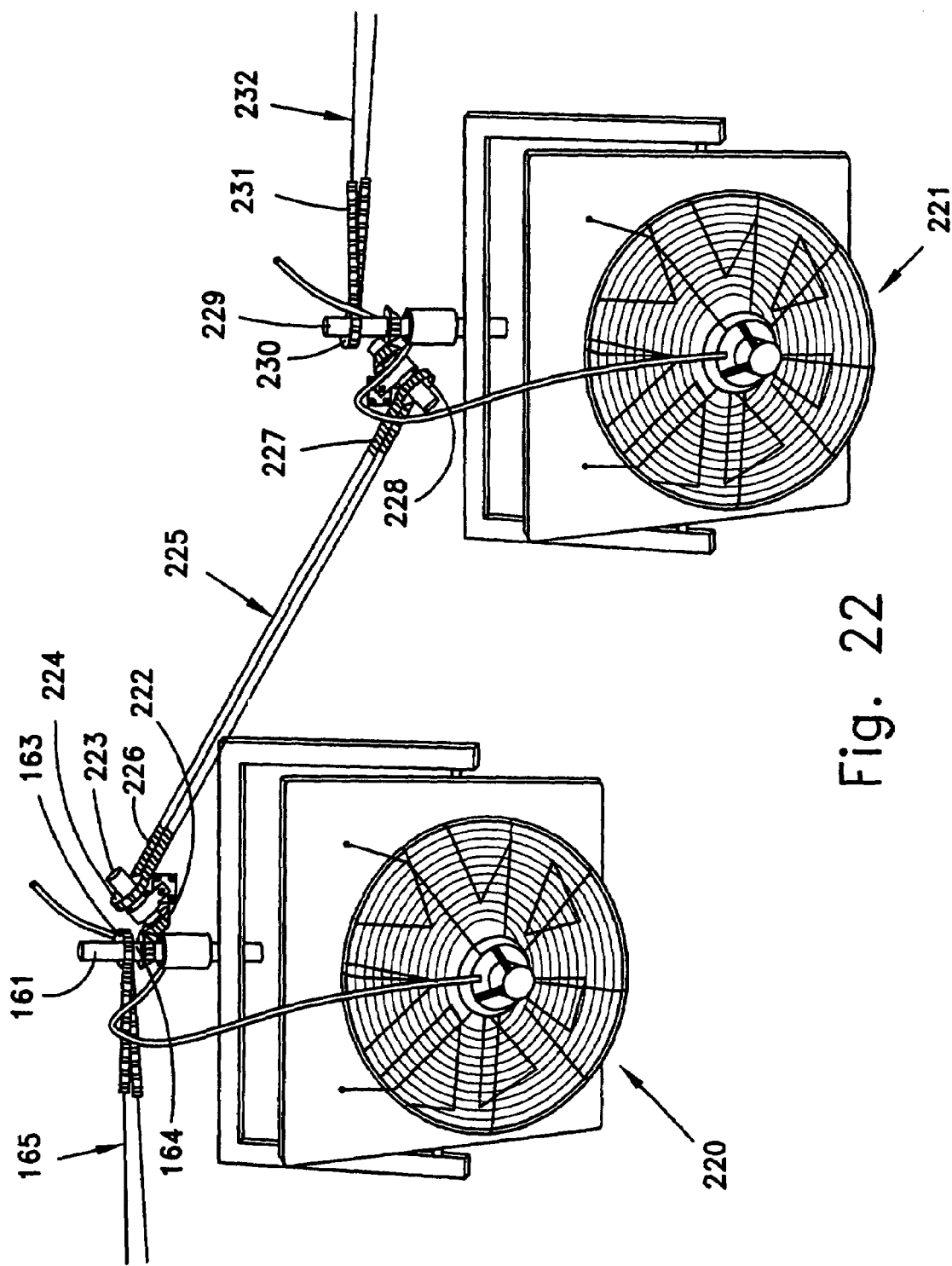
FIG. 22 schematically illustrates the application of the invention to rows of cow at different vertical levels.

FIG. 22 illustrates the case that the sprayers must be arranged in segments of row placed at different levels, due to the structure of the shed. The sprayers are assumed to be structured as illustrated in FIGS. 17 and 18. As in said figures, the last sprayer 220 of the first segment has a shaft 161, actuated by flexible member 165 through its upper gear wheel 163. Its lower gear wheel 164, however, meshes with a gear wheel 222 keyed to a first slanted shaft 223, to which a second gear wheel 224 is also keyed. Gear wheel 224 meshes with gearing 226 of a slanted flexible member 225. When shaft 181 is angularly displaced, gear wheel 224 displaces flexible member 225 by drawing in one leg thereof and paying the other leg out.

Another gearing 227 is carried by flexible member 225 and meshed with gear wheel 228 of a second slanted shaft 229 and rotates said shaft. Shaft 229 has another gear wheel 230 keyed thereto. Gear wheel 230 meshes with a gearing 231 carried by another flexible member 232, which transmits angular displacements to a following sprayer, not seen in the drawing, in the same way that has been described herein before.

Figure 23:
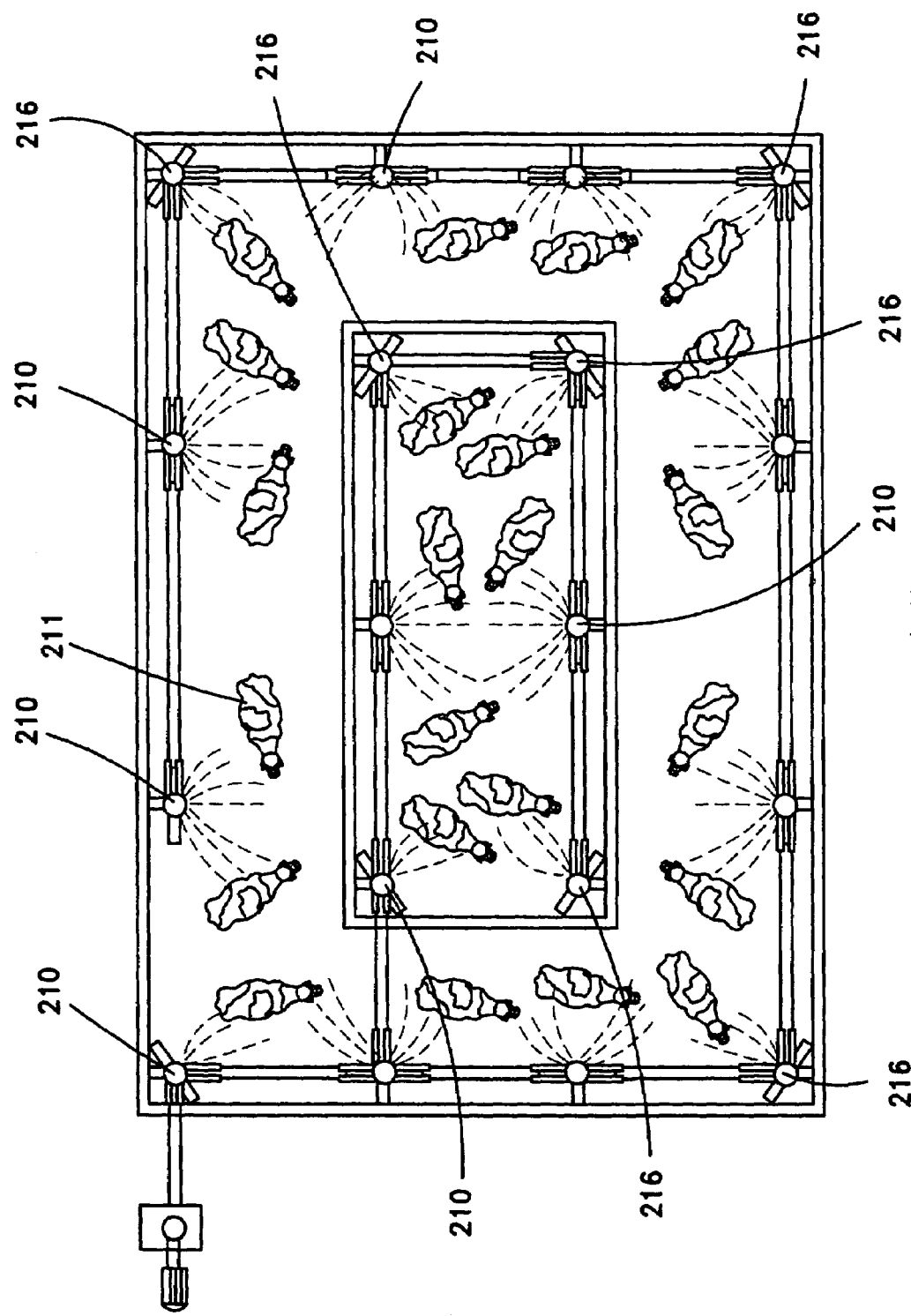
FIG. 23 is a schematic plan view illustrating the application of the invention in a shed where two closed polygons are formed by the sprayers.

FIG. 23 shows a similar situations for a shed in which the cows 211 are arranged within the area of a closed polygon. Sprayers 210 are arranged correspondingly in two rectangles, and each row comprises four segments which form the same angle α between them. At the point where the two segments of each row meet, is placed a sprayer 216 which transmits the angle of displacement from the preceding sprayer 210' to the following sprayer 210. In place of sprayer 216, if said sprayer is not requested to spray a cow, a shaft should be placed to transmit said angle of displacement. This way, the angles of all the sprayers are concurrently changed using a single motor. The control station may cause all sprayers to oscillate within a predetermined sector, as well as to terminate the operation of those sprayers that are in an opposite position with respect to the wind direction. The said two rectangles could be placed at different levels and connected in the way shown in FIG. 22.

Figure 24:
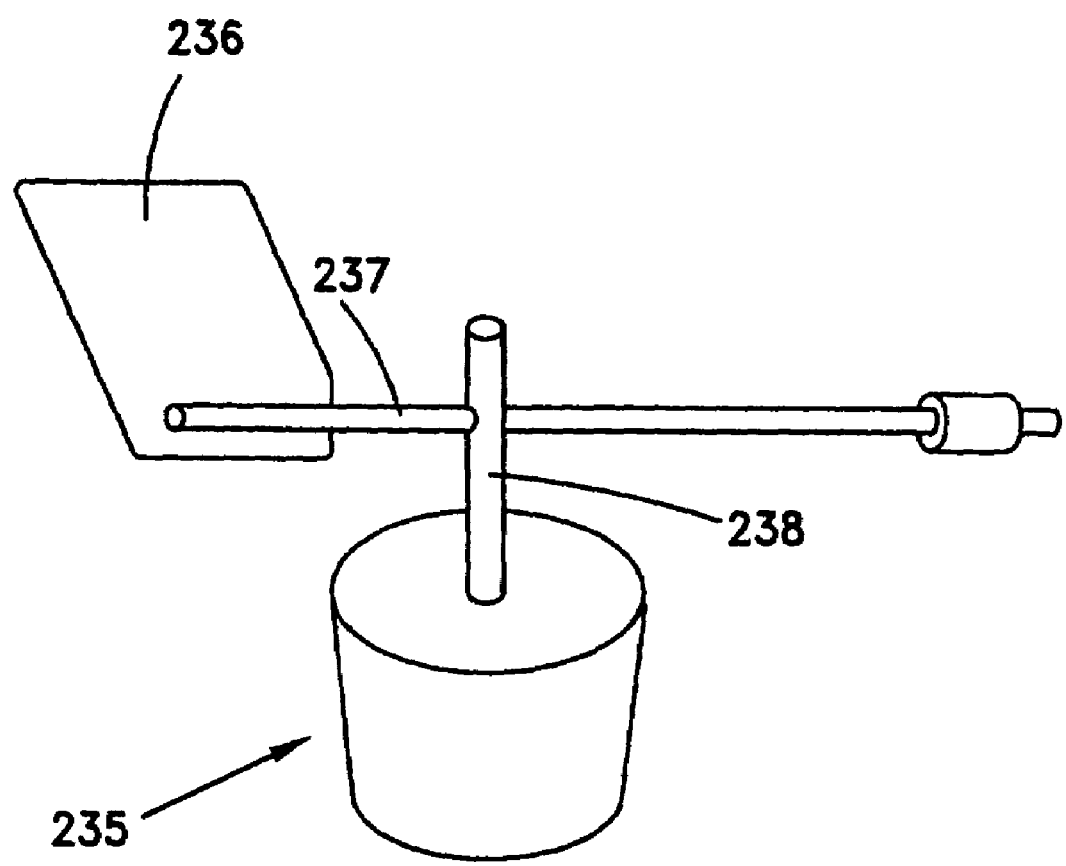
FIG. 24 is a schematic illustration of a wind sensor.

FIG. 24 schematically illustrates a wind sensor 235, which comprises a plate or flag 236 mounted on an arm 237 attached to a rotatable shaft 238. Sensor 235 preferably comprises means, such as e.g. spring means, for reacting to the rotation of shaft 238, so that it be contained within predetermined limits no matter what may be the direction and speed of wind that are considered possible. The rotation of shaft 238 generates a signal, which is transmitted to the control of the apparatus. In extreme wind conditions, e.g. if the wind strongly blows against the desired direction of the water sprays, the said signal may cause the sprayers to stop operation in order to avoid waste of water.

Figure 25:
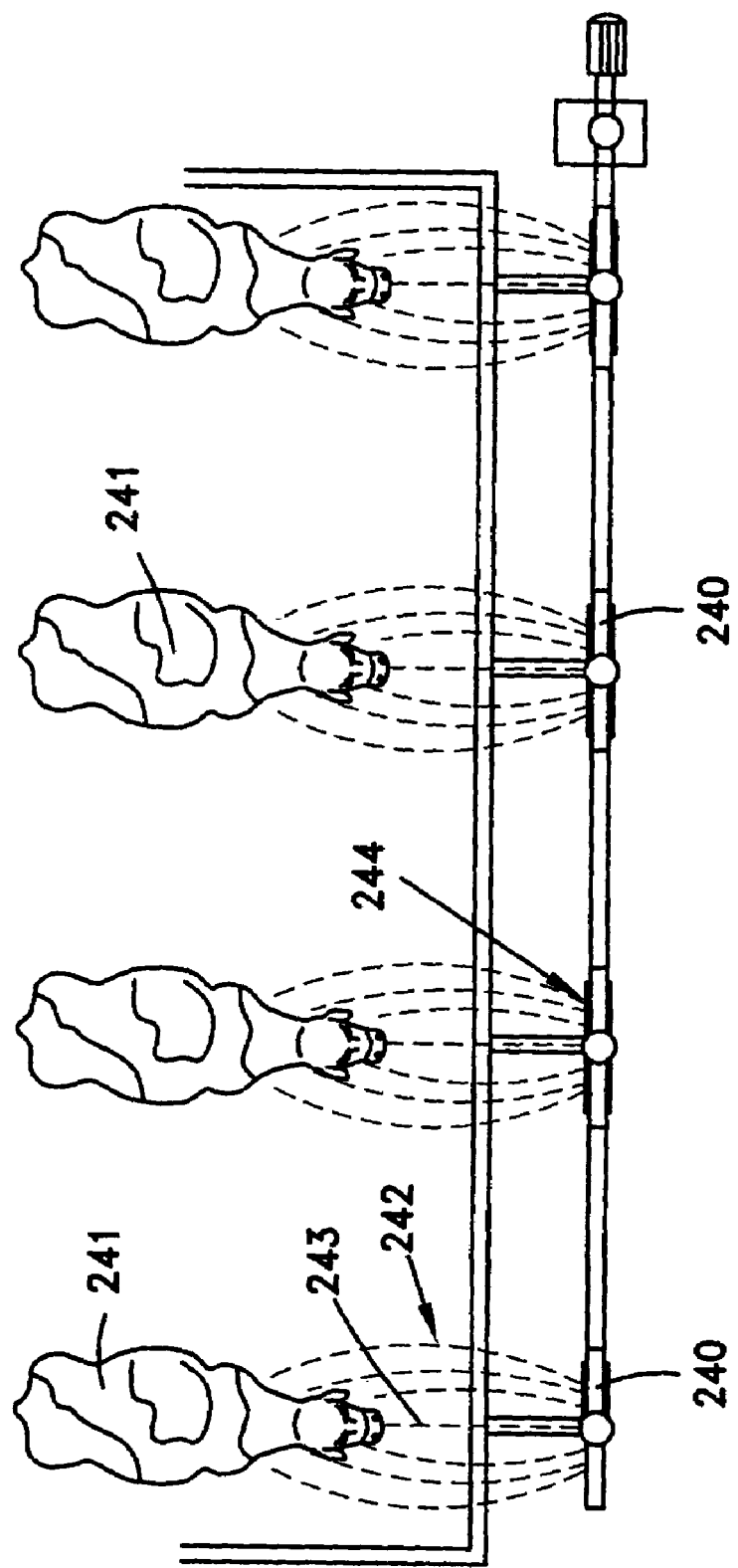
FIGS. 25 and 26 show an example of the influence of a transverse wind on the angular adjustment of the sprayers FIG. 27 schematically illustrates a control station.
Figure 26:
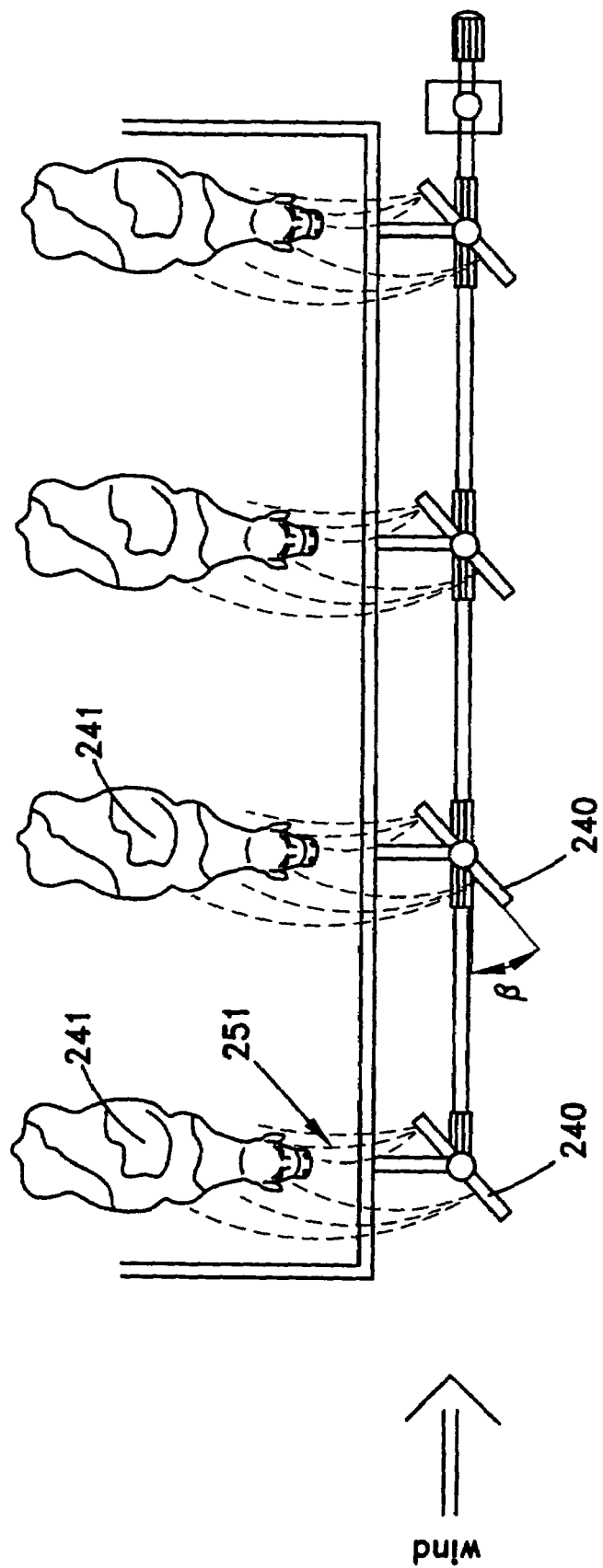

FIGS. 25 and 26 schematically illustrate one example of the influence of the wind on the angular adjustment of the sprayers. Only one row of sprayers 240 and one row of cows, schematically indicated at 241, are shown. In FIG. 25, no significant wind is blowing. Each of the water sprays 242 is essentially symmetric with respect to an axis 243, which is the axis of the sprayer and is therefore perpendicular to the face 244 of the sprayer. In FIG. 25, a significant wind 250 is blowing crosswise of the sprayer row, from the left as seen in the drawings, viz. from the west. To take the wind into account, each sprayer has been turned by an angle β counter-clockwise, as seen in the drawing, viz. with the axis of its fan pointing approximately in a northwest direction. As a consequence, the water sprays have assumed the curved shape 251 and reach the cows in spite of the wind.

Figure 27:
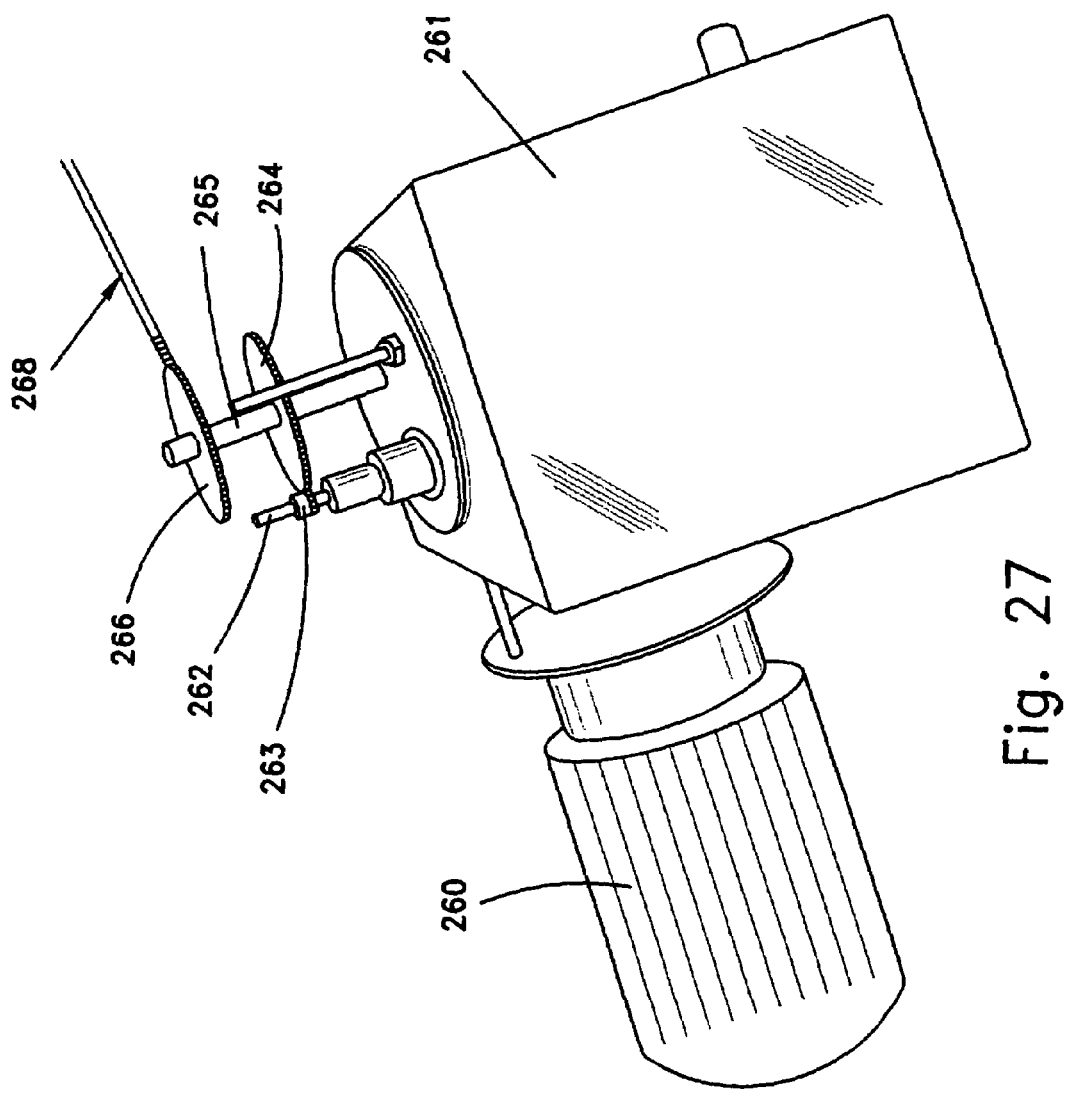

FIG. 27 illustrates at an enlarged scale a detail of said connection of the first sprayer with a control station. The control station comprises a motor 260 and a housing 261, which houses a gear transmission from the shaft of said motor 260 to a shaft 262 to which is keyed a gearwheel 263. Gear wheel 263 meshes with a gear 264 keyed to a shaft 265, to which is also keyed a gear wheel 266. Gear wheel 266 meshes with gearing 267, and therefore, when it rotates, flexible member 268 is displaced along itself, viz. one of its legs is drawn in and the other is paid out, and displaces the first sprayer (not shown) in the way previously described e.g. in connection to FIG. 17. Other means, in general any convenient means, could be used to displace flexible member 268 by drawing in one leg thereof and paying the other leg out. For instance, a shaft corresponding to shaft 265 could be rotated manually, through a lever or in any other way. It would be even possible to substitute a plain or grooved wheel for gear wheel 265, to omit gearing 267, and to relay on frictional engagement between said plain or grooved wheel and flexible member 268. Housing 261 also conveniently contains the control processor which controls the operation of the apparatus according to the relevant parameters, comprising the parameters of the wind.

Figure 28:
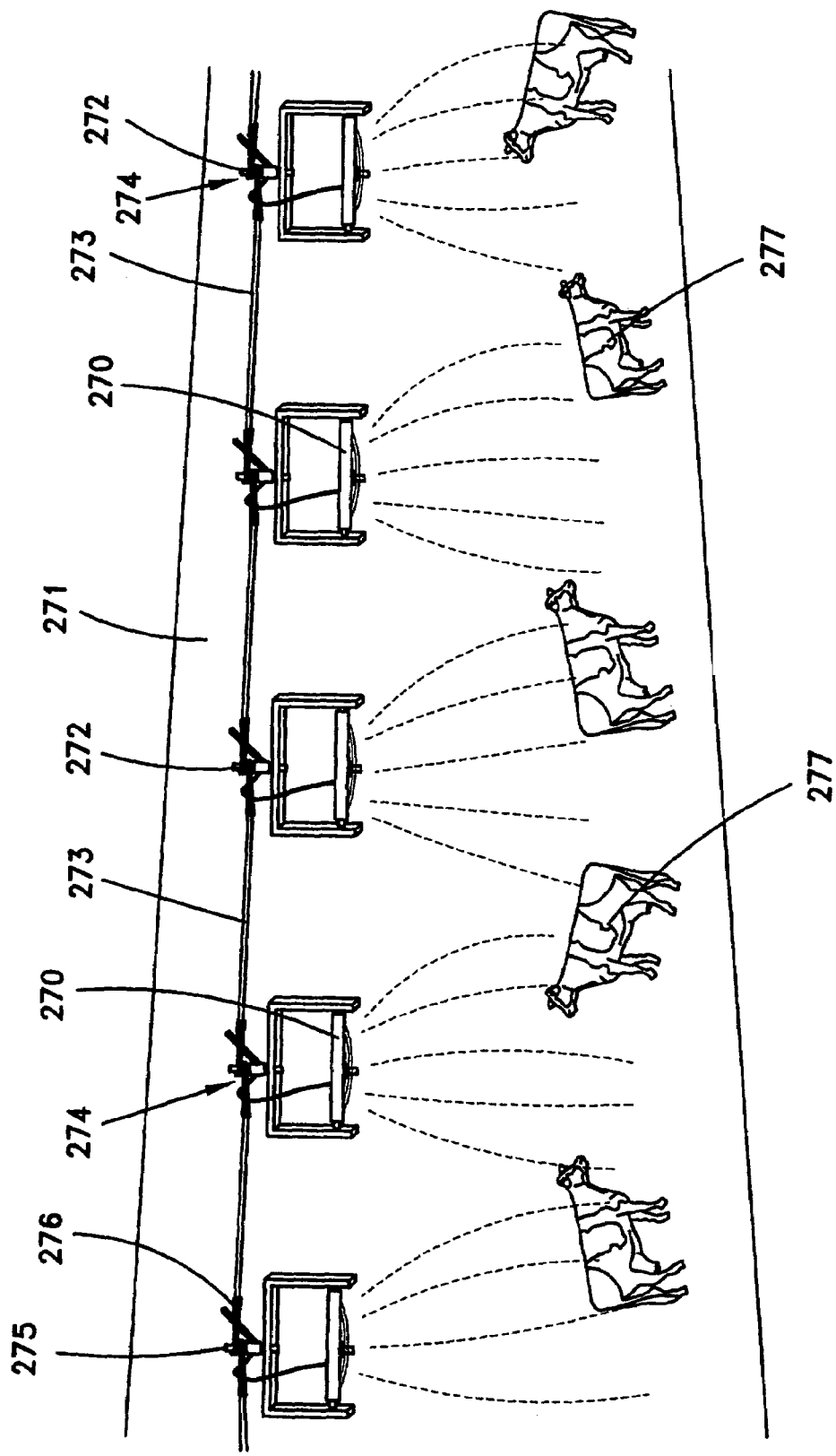
FIG. 28 schematically illustrates a row of horizontal sprayers mounted above a row of cows.

FIG. 28 schematically illustrates in vertical view a row of sprayers 270 having horizontal faces, supported by vertical shafts 272, which are suspended by any convenient means from the ceiling or other structural elements of a shed or the like, schematically indicated at 271. All of said sprayers are angularly displaceable concurrently by two-way flexible members 273 through a gearing connection, generally indicated at 274, each of which connections comprises a gear wheel 275 keyed to a shaft 272 and a gearing 276 mounted on the corresponding flexible member 273. All the said kinematic elements are similar to those described hereinbefore in connection with sprayers having vertical faces. The sprayers 270 are so placed and oriented as to direct their sprays to cows 277.

Figure 29:
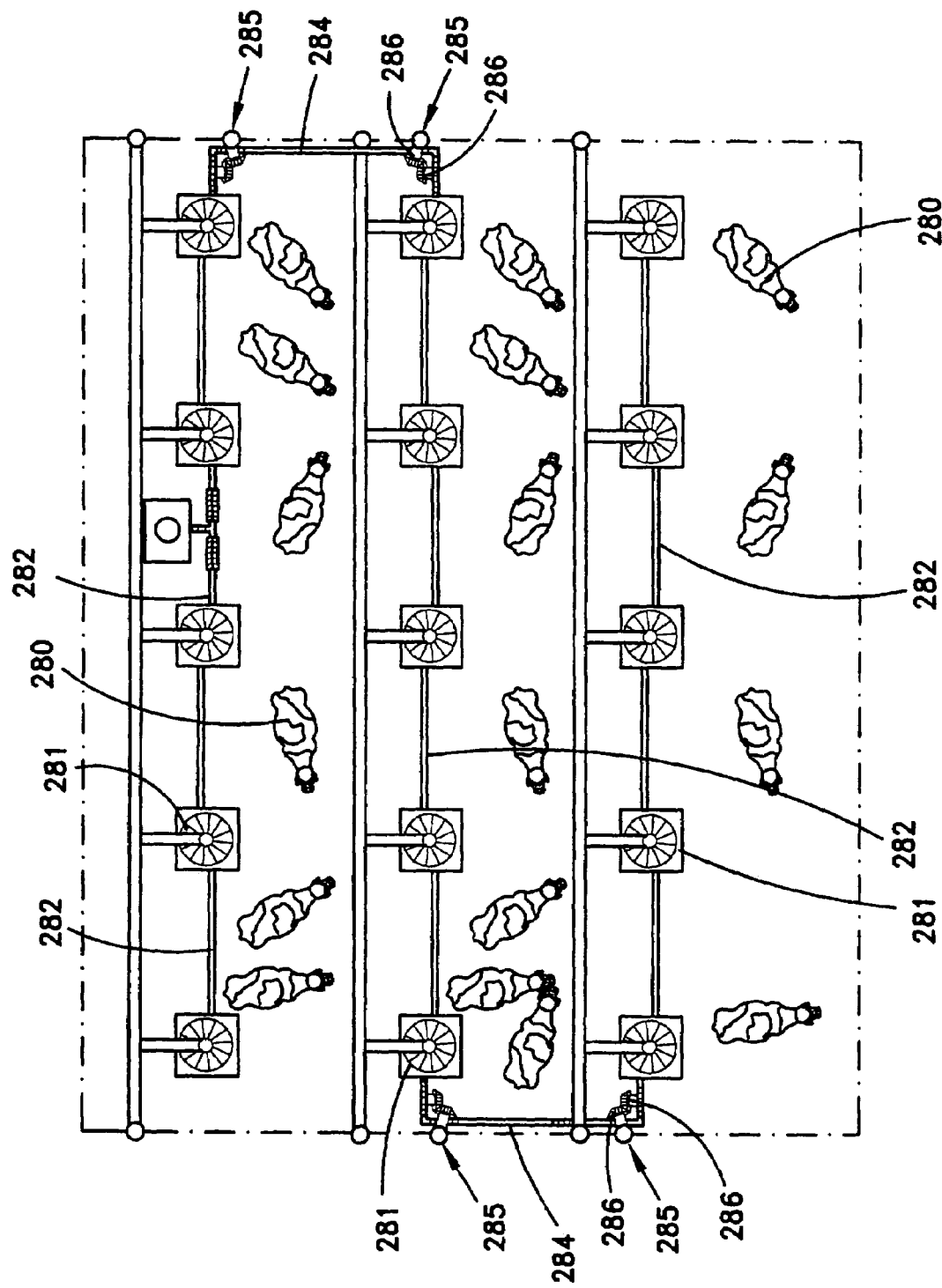
FIG. 29 a number of parallel row of horizontal sprayers.

FIG. 29 schematically illustrates, in horizontal view from the top, a spraying apparatus for cows 280 arranged in a plurality of parallel rows. Each row is structured as shown in FIG. 28, and comprises a number of sprayers 281 having downwardly directed vertical axes and being angularly displaceable by flexible members 282, in the manner explained with regard to previous embodiments. All the flexible members 282 are concurrently actuated by control station 283, which directly actuates the first flexible member, indicated at 282', while each flexible member directly actuates the following one. The flexible members of successive sprayer rows are operatively connected by transverse flexible members 284, each of which is connected at each end to the adjacent flexible member 282 by any convenient orthogonal connection, generally indicated at 285, said connection comprising, in this embodiment, two angularly set, meshing gears 286, each mounted on a shaft, one of said shafts being rotatable by a flexible member 282 and the other by the adjacent transverse flexible member 284.

In all the illustrated embodiments, the sprayers are illustrated as having a given orientation and the sprays as having given axes, which orientation and axes may be adjusted to take account of the influence of the wind. As has been said, the spray devices may comprise a means for adjusting their radial position, e.g. relative to a vertical post. All the aforesaid adjustments, however, are intended to determine and maintain an optimal orientation of the sprayers and an optimal direction of the sprays, to be changed manually or automatically as described hereinbefore, if environment or operational changes make said orientation and direction no longer optimal. However, according to an aspect of the invention, the orientation of the sprayers may be cyclically changed, or, in other words, the sprayers may be periodically oscillated between two extreme positions. Such an oscillation is compatible with and may be added to all the adjustments hereinbefore described. It has the consequence that the sprays or mist streams do not consistently land on the same area, but swing approximately along an arc of circle. The targets in the area covered by the swinging sprays receive less water, but more targets receive water, than they would receive if the orientation of the sprayers were fixed. This embodiment of the invention is therefore particularly useful when the amount of water thus received by each target is sufficient; and in many cases said amount will be optimal. A smaller number of sprayers and cooperating mechanical elements is required, which involves a saving in equipment, and less water is consumed.

Figure 30:
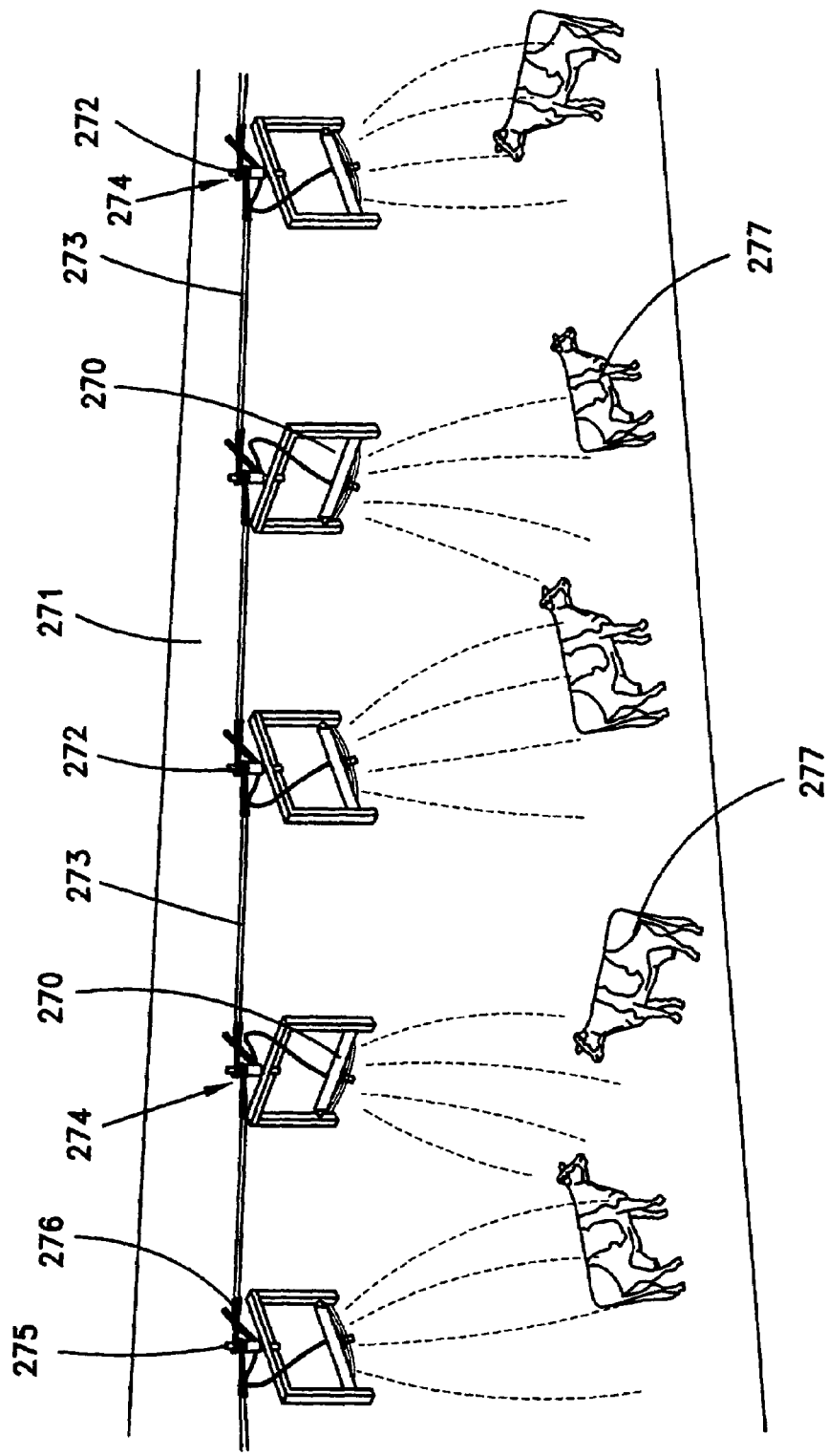
FIG. 30 illustrates in perspective view a cooling installation comprising a plurality of sprayers such as that of FIG. 1, supported on pivotable arms, in one orientation of said sprayers.

How to obtain said oscillating motion of the sprayers, will be obvious to skilled persons. For instance, the arrangement of FIG. 19 may be used, by causing motor 198 periodically to reverse its rotation and thus to reverse the direction of linear displacement of the flexible member 191 (reversing each arm thereof from being drawn in to being paid out, and vice versa) and to maintain each direction of rotation for the time that is necessary for every sprayer to swing by the desired angle in each direction, as shown in FIG. 30. Alternatively, the motor may be coupled to a joint or gearing that produces the required reversal of rotation or linear displacement. Another, though less economical, way of obtaining said oscillating motion of the sprayers would be to provide each of them with a reversible drive and controlling said drives separately or together.

Figure 31:
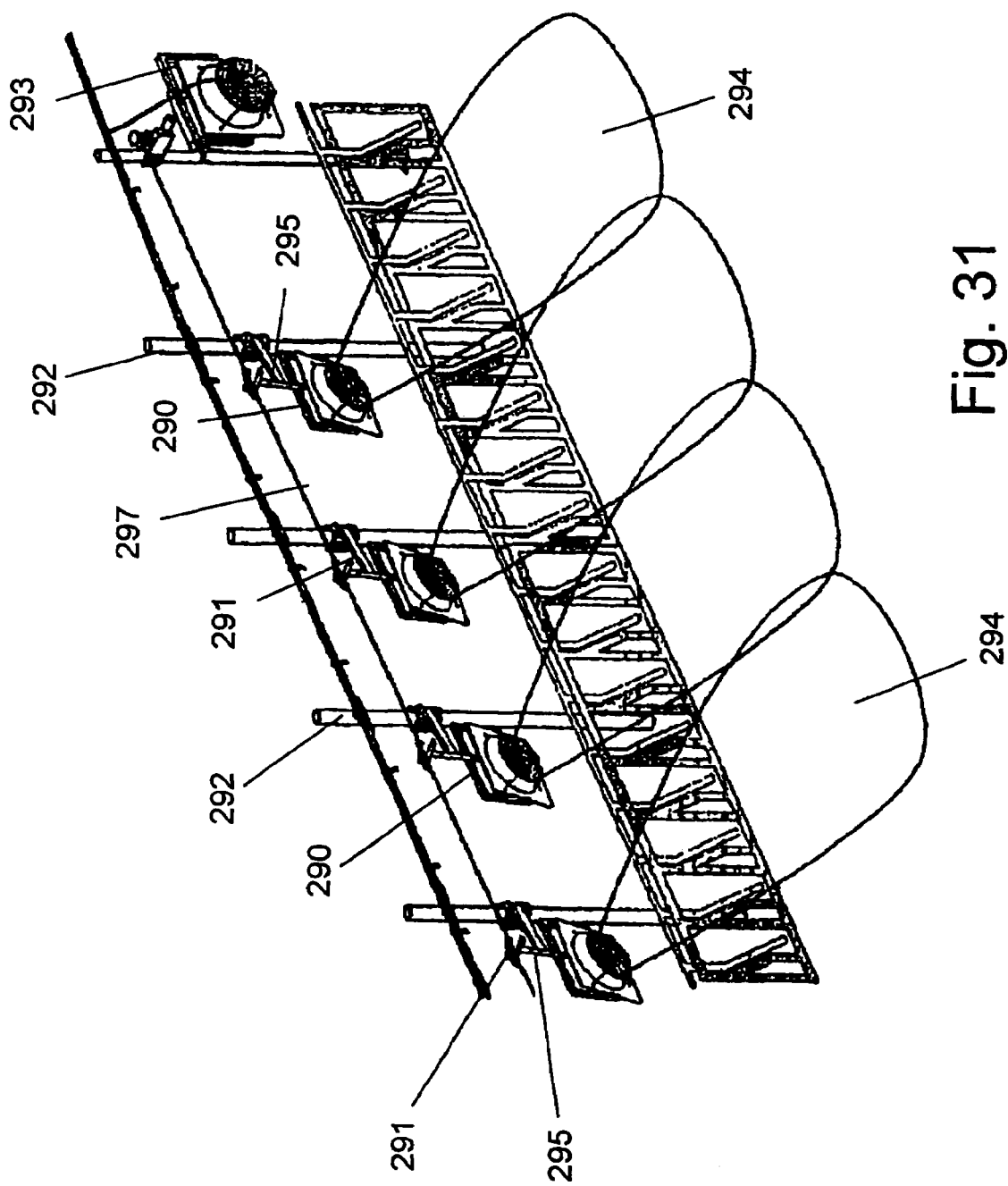
FIGS. 31 to 34 illustrate another application of the sprayers according to this invention, in which the spraying direction is concurrently rotated by a joint cable.
Figure 32:
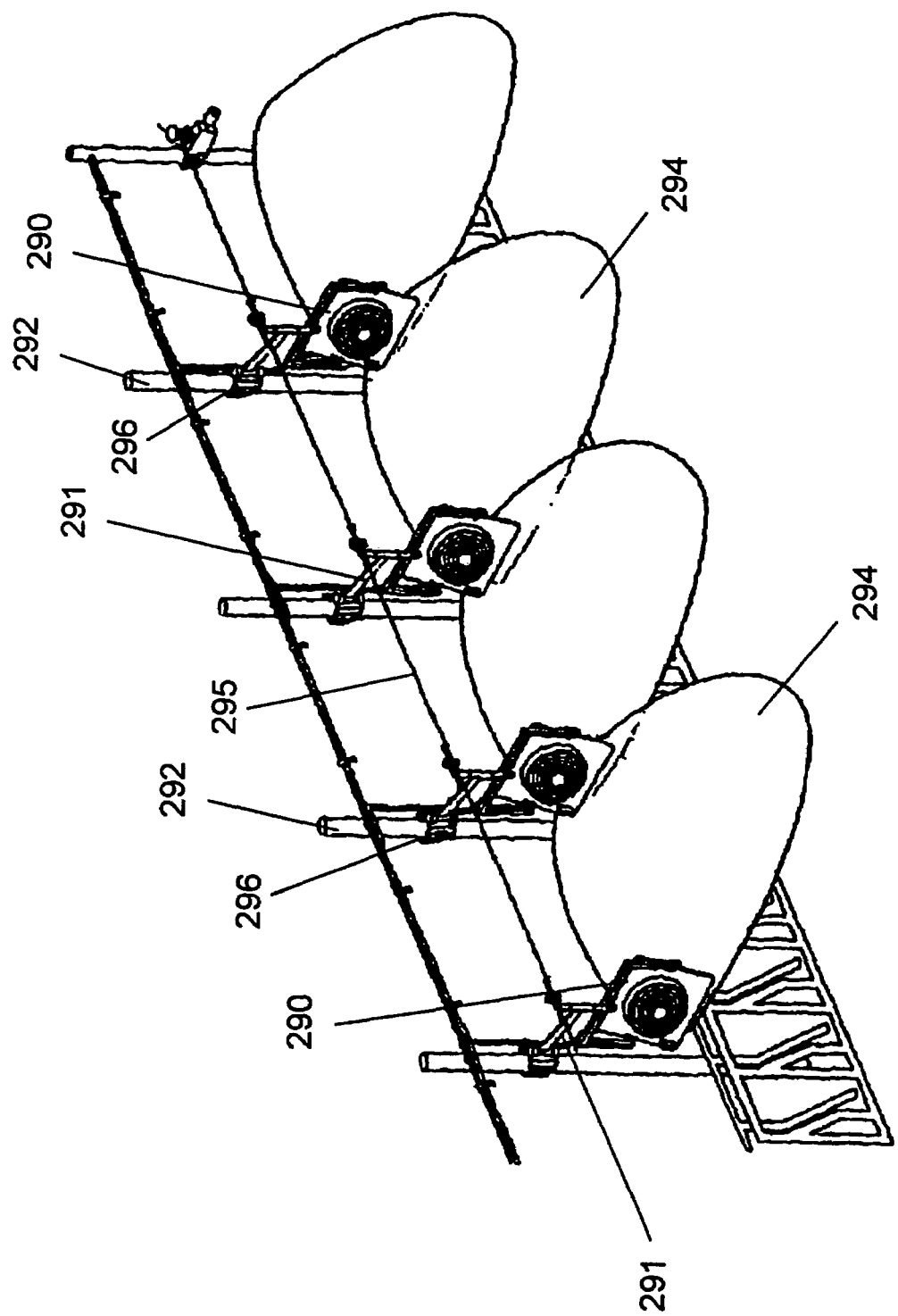
Figure 33:
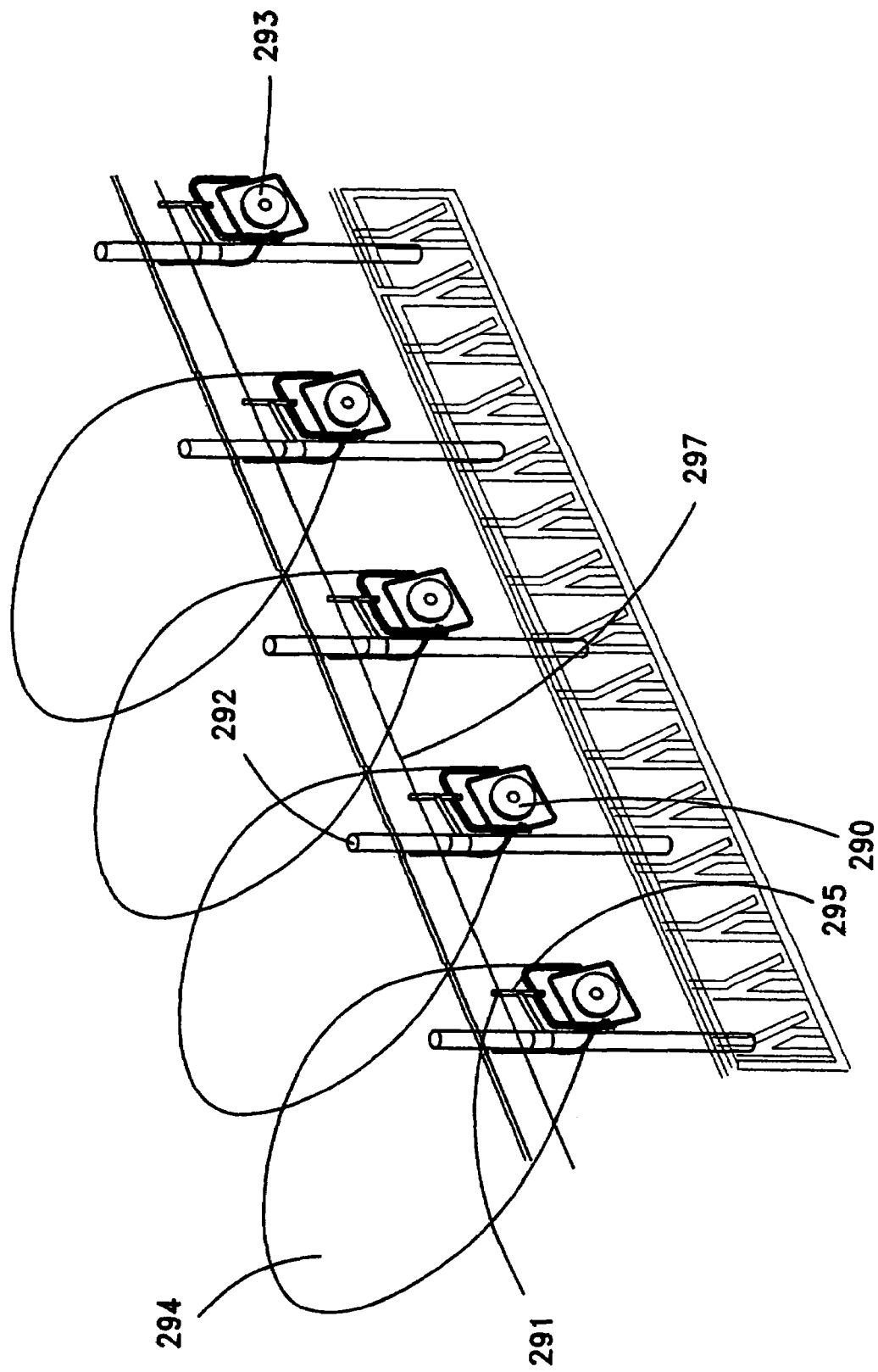
Figure 34:
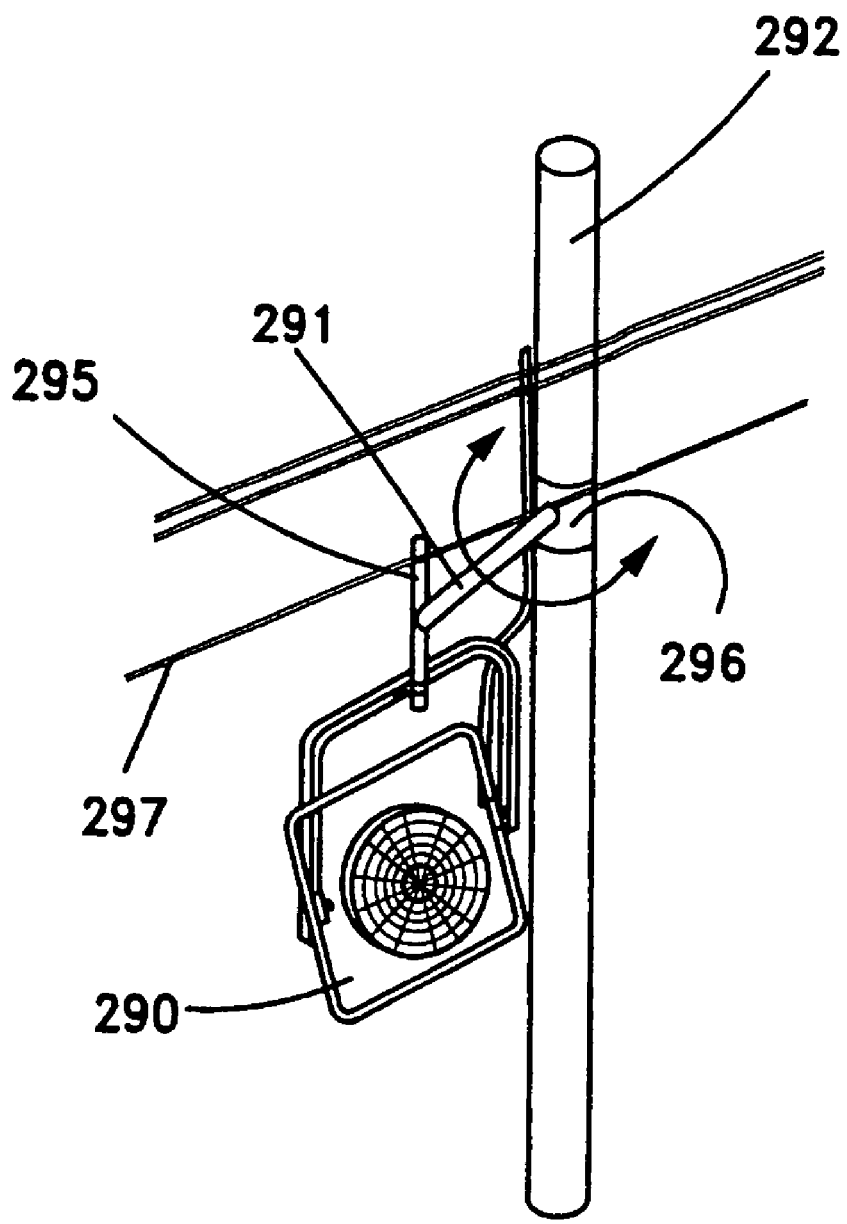

FIGS. 31 to 34 illustrate another application of the sprayers according to this invention. A cooling installation comprises a plurality of sprayers 290. Each sprayer is mounted on an arm 291 pivoted to a structural support, viz. to a static component of the structure housing the cooling installation, which support is illustrated for purposes of example only as a column 292. In FIG. 31, one sprayer 293 (not shown in FIG. 32) only is not so mounted and is fixed. In the position of FIG. 31 the sprayers 290 are oriented so that all their front surfaces lie on the same plane and the emitted sprays are directed substantially perpendicularly to said plane, as shown at 294. Each spray generates on opposite reaction on the respective sprayer. If arms 291 are free to swing, said reaction will form a moment about the respective arm 291, which will cause said arm to swing in the direction of said moment and the respective sprayer to change its orientation accordingly. Said swing of said arms is conveniently limited by stoppers of any kind, not shown in the drawings.

Preferably, however, the arms 291 are not allowed to swing freely. Each sprayer 290 is suspended from a substantially vertical arm 295, attached, preferably by a pivot not shown, to the respective arm 291. All arms 295 are connected, preferably by pivots 296, to a common longitudinal element, which may have any structure, but in the example illustrated is cable 295. By exerting a traction on cable 295, manually or through one of the sprayers, or by any other mechanical means easily designed by skilled persons, all arms 291 and therefore all sprayers 290 can be concurrently swung about columns 292. The action effected through cable 295 may be parallel to that of the reaction generated by the sprays, or it may opposite to it or unrelated to it. For instance, if one considers FIGS. 31 and 32 as showing opposite sides of the row of sprayers, one sees that the reaction of the sprays will tend to swing the sprayers from the position of FIG. 31 to that of FIG. 32, but it will be necessary to exert a further traction on cable 295 to bring them to the position of FIG. 33, where the sprayers 290 are oriented so that all their front surfaces lie again on the same plane, but after completing a maximal rotation of 180°, such that and the emitted sprays are directed substantially perpendicularly to said plane, as shown at 294', i.e., to the opposite direction of 294.

While the invention has been described and illustrated as intended for the cooling of cattle, it should be understood that the apparatus of the invention may be used for other purposes, viz. for cooling targets other than cattle, for instance vegetation, and this used too is comprised within the scope of the invention; and while embodiments have been described and illustrated to exemplify the invention, it will be understood that the invention may be carried out with many modifications variations and adaptations without departing from the scope of the claims.

The invention claimed is:

1. Method for controlling the temperature of a target animal at a given location about 16 meters distant comprising the steps of:
   a. providing an air fan assembly comprised of a housing including an air inlet and a planar member defining an air outlet opening and an air fan juxtaposed in said air outlet opening in said planar member with the planar member peripherally surrounding said fan on all sides and extending peripherally outwardly thereof, said air fan having blades rotary mounted on a hub that has a longitudinal axis about which said blades rotate and a motor driving said fan;
   b. mounting said air fan assembly on a support for pivoting about an axis normal to the longitudinal axis of said hub;
   c. operating said air fan assembly to generate, downstream from the air fan, an air stream having a maximum velocity of 2 m/sec;
   d. providing a cylindrical nozzle chamber fixed to the air outlet side of the fan longitudinally aligned with the hub and of substantially the same diameter and having a front portion facing forward in the direction the air stream flow, said chamber defining at least one forward facing opening;
   e. introducing liquid via a liquid inlet to the cylindrical nozzle chamber with an orientation that produces centrifugal motion for liquid within the cylindrical nozzle chamber, said liquid being introduced under a pressure of from about 3 to 6 atm and at a flow rate of from about 5 l/hr to about 50 l/hr;
   f. press fitting at least one replaceable flexible hollow elongated nozzle into said forward facing opening; and
   g. discharging the centrifugally moving liquid in said cylindrical nozzle chamber through said at least one flexible hollow elongated nozzle to form a conic spray centrally entrained in said air stream for controlling the temperature of a target animal at a given location about 16 meters distant from said at least one flexible hollow elongated nozzle.

2. The method according to claim 1 including the further steps of
   i. sensing a condition relative to the target animal location; and
   j. controlling, responsive to said sensed condition, one of delivery of liquid to the cylindrical nozzle chamber and the relative angle of the axis of the air stream with respect to target animal location in order to maintain an effective entrained air stream at the target animal location.

3. Method according to claim 2 wherein sensing includes timing the mist generation and wherein the step of introducing liquid is operated intermittently.

4. Method according to claim 2 wherein sensing includes determining an ambient condition.

5. Method according to claim 1 including the further step of mounting the support for vertical articulation.

6. Method according to claim 1 further including the steps of supporting the air fan assembly relative to a fixed point and adjusting the air fan assembly relative to said fixed point.

7. Method according to claim 6 further including the steps of adjusting the air fan assembly by differential pressure to a first position and adjusting the air fan assembly to a second position by gravity.

8. Method according to claim 1 wherein a plurality of flexible hollow elongated nozzles are each press fitted into a forward facing opening of said chamber 9. Method according to claim 8 wherein four flexible hollow elongated nozzles are each press fitted into four equally distributed forward facing openings of said chamber.

10. Method according to claim 1 wherein the method steps recited are carried out for a plurality of target animals at a plurality of target locations using a plurality of air fan assemblies.

* * * * *